US012531886B2

(12) United States Patent
Yang et al.

(10) Patent No.: US 12,531,886 B2
(45) Date of Patent: Jan. 20, 2026

(54) MACHINE LEARNING FOR PRIORITIZING TRAFFIC IN MULTI- PURPOSE INLINE CLOUD ANALYSIS (MICA) TO ENHANCE MALWARE DETECTION

(71) Applicant: Palo Alto Networks, Inc., Santa Clara, CA (US)

(72) Inventors: Sheng Yang, Santa Clara, CA (US); Curtis Leland Carmony, Albuquerque, NM (US); Ali Islam, Fremont, CA (US); Kashyap Tavarekere Ananthapadmanabha, San Jose, CA (US); William Redington Hewlett, II, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 38 days.

(21) Appl. No.: 18/385,844

(22) Filed: Oct. 31, 2023

(65) Prior Publication Data
US 2025/0141894 A1 May 1, 2025

(51) Int. Cl.
H04L 9/40 (2022.01)
G06N 20/00 (2019.01)

(52) U.S. Cl.
CPC ......... H04L 63/1425 (2013.01); G06N 20/00 (2019.01)

(58) Field of Classification Search
None
See application file for complete search history.

(56) References Cited

U.S. PATENT DOCUMENTS 8,375,450 B1 * 2/2013 Oliver ................... G06F 21/564
713/181
8,661,547 B1 2/2014 Kononov
9,043,894 B1 * 5/2015 Dennison ............ H04L 63/1408
726/11

(Continued)

FOREIGN PATENT DOCUMENTS

CN 119563303 3/2025

OTHER PUBLICATIONS

ACM—Association for Computing Machinery, IWCTS 2009, Proceedings of The Second International Workshop on Computational Transportation Science in Conjunction with ACM SIGSPATIAL GIS 2009, Nov. 3, 2009.

(Continued)

Primary Examiner — Backhean Tiv
(74) Attorney, Agent, or Firm — Van Pelt, Yi & James LLP

(57) ABSTRACT

Techniques for machine learning for prioritizing traffic in multi-purpose inline cloud analysis (MICA) to enhance malware detection are disclosed. In some embodiments, a system, a process, and/or a computer program product for machine learning for prioritizing traffic in multi-purpose inline cloud analysis (MICA) to enhance malware detection includes processing a set of data for network security analysis to extract a file; determining that the file is to be offloaded to a cloud security entity for security processing based at least in part on a prefilter model that is implemented as a machine learning model; forwarding the file to the cloud security entity using a multi-purpose inline cloud analysis (MICA) channel; and performing an action in response to receiving a verdict from the cloud security entity.

19 Claims, 12 Drawing Sheets

(56) References Cited

U.S. PATENT DOCUMENTS

| | | | |
|---|---|---|---|
| 9,805,193 B1 | 10/2017 | Salsamendi | |
| 9,894,578 B1 | 2/2018 | Jawaharlal | |
| 10,169,579 B1* | 1/2019 | Xu | H04L 63/1425 |
| 10,225,137 B2 | 3/2019 | Jain | |
| 10,452,993 B1* | 10/2019 | Hart | G06N 20/00 |
| 10,897,480 B2* | 1/2021 | Grubel | G06N 3/0464 |
| 11,323,454 B1 | 5/2022 | Li | |
| 11,468,185 B2* | 10/2022 | Hayes | H04L 51/08 |
| 11,611,571 B2* | 3/2023 | Lindquist | H04L 63/1425 |
| 11,818,134 B1 | 11/2023 | Gibson | |
| 11,880,460 B2* | 1/2024 | Sevcenko | G06F 21/53 |
| 12,067,115 B2* | 8/2024 | Kulaga | G06F 16/285 |
| 12,346,236 B2 | 7/2025 | Yamato | |
| 2013/0347075 A1 | 12/2013 | Narendra | |
| 2014/0189267 A1 | 7/2014 | Qi | |
| 2014/0280940 A1 | 9/2014 | Chapman | |
| 2014/0334495 A1 | 11/2014 | Stubberfield | |
| 2015/0134485 A1 | 5/2015 | Kim | |
| 2015/0341230 A1 | 11/2015 | Dave | |
| 2015/0341235 A1 | 11/2015 | Ni | |
| 2016/0019636 A1 | 1/2016 | Adapalli | |
| 2017/0310703 A1 | 10/2017 | Ackerman | |
| 2018/0115525 A1 | 4/2018 | Chou | |
| 2018/0324201 A1 | 11/2018 | Lowry | |
| 2020/0076835 A1 | 3/2020 | Ladnai | |
| 2020/0099549 A1 | 3/2020 | Gummadidala | |
| 2020/0210581 A1 | 7/2020 | Salsamendi | |
| 2020/0259792 A1 | 8/2020 | Devarajan | |
| 2021/0060426 A1 | 3/2021 | Baca | |
| 2021/0158199 A1 | 5/2021 | Heckey | |
| 2021/0382808 A1 | 12/2021 | Zhang | |
| 2022/0006805 A1 | 1/2022 | Kulkarni | |
| 2022/0014602 A1 | 1/2022 | Sai Sampath | |
| 2022/0067146 A1* | 3/2022 | Cai | G06F 21/566 |
| 2022/0103525 A1 | 3/2022 | Shribman | |
| 2022/0131879 A1 | 4/2022 | Naik | |
| 2022/0155992 A1 | 5/2022 | Nortman | |
| 2022/0239508 A1 | 7/2022 | Liu | |
| 2022/0318097 A1 | 10/2022 | Quan | |
| 2022/0374294 A1 | 11/2022 | Van Der Merwe | |
| 2022/0417332 A1 | 12/2022 | Chiganmi | |
| 2023/0039584 A1 | 2/2023 | Luo | |
| 2023/0110404 A1 | 4/2023 | Raj Susairaju | |
| 2023/0125134 A1 | 4/2023 | Raleigh | |
| 2023/0169181 A1 | 6/2023 | Bargury | |
| 2023/0300114 A1 | 9/2023 | Bhallamudi | |
| 2024/0040378 A1 | 2/2024 | John Thomas | |
| 2024/0152401 A1 | 5/2024 | Naseem | |
| 2024/0250970 A1* | 7/2024 | Lai | H04L 63/1416 |
| 2024/0291816 A1 | 8/2024 | Hulick | |
| 2025/0117482 A1* | 4/2025 | Bazalgette | H04L 63/20 |
| 2025/0141886 A1* | 5/2025 | Lai | H04L 63/1416 |
| 2025/0141894 A1* | 5/2025 | Yang | G06N 20/00 |
| 2025/0193250 A1 | 6/2025 | Patnala | |

OTHER PUBLICATIONS

Inagaki et al., Prioritization of Mobile IoT Data Transmission Based on Data Importance Extracted From Machine Learning Model, Special Section on Intelligent and Cognitive Techniques for Internet of Things, IEEE Access, vol. 7, 2019, pp. 93611-93620.

Saeed et al., Towards Optimizing WLANs Power Saving: Novel Context-Aware Network Traffic Classification Based on a Machine Learning Approach, IEEE Access, vol. 7, 2019, pp. 3122-3135.

Shinkuma et al., Data Assessment and Prioritization in Mobile Networks for Real-Time Prediction of Spatial Information using Machine Learning, EURASIP Journal on Wireless Communications and Networking, 2020, pp. 1-19.

\* cited by examiner

| | Forwarding rate (in session bytes) | Forwarded TP/All Customer Malware | Unique MICA Detection Rate |
|---|---|---|---|
| No MICA Prefilter (Random) | 1% | 0.8% | 0.1% |
| Benign vs Malware | 0.86% | 55.46% | 6.78% |

FIG. 8A

| | Forwarding rate (in session bytes) | Forwarded TP/ALL CUSTOMER MALWARE | Unique MICA Detection Rate |
|---|---|---|---|
| No MICA Prefilter (Random) | 1% | 0.8% | 0.1% |
| Benign vs Malware | 0.86% | 55.46% | 6.78% |
| Benign vs Malware not detected by MLAV (after relabeling) | 1.11% | 10.53% | 3.38% |

FIG. 8B

MACHINE LEARNING FOR PRIORITIZING TRAFFIC IN MULTI- PURPOSE INLINE CLOUD ANALYSIS (MICA) TO ENHANCE MALWARE DETECTION

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) queries to exfiltrate data. Accordingly, there exists an ongoing need for improved techniques to detect malware and prevent its harm. Techniques for detecting malware may be performed locally by a firewall or via a cloud service.

BRIEF DESCRIPTION OF THE DRAWINGS

Various embodiments of the invention are disclosed in the following detailed description and the accompanying drawings.

FIGS. 8A-8B are tables of evaluation metrics of experiment results.

DETAILED DESCRIPTION

Figure 1:
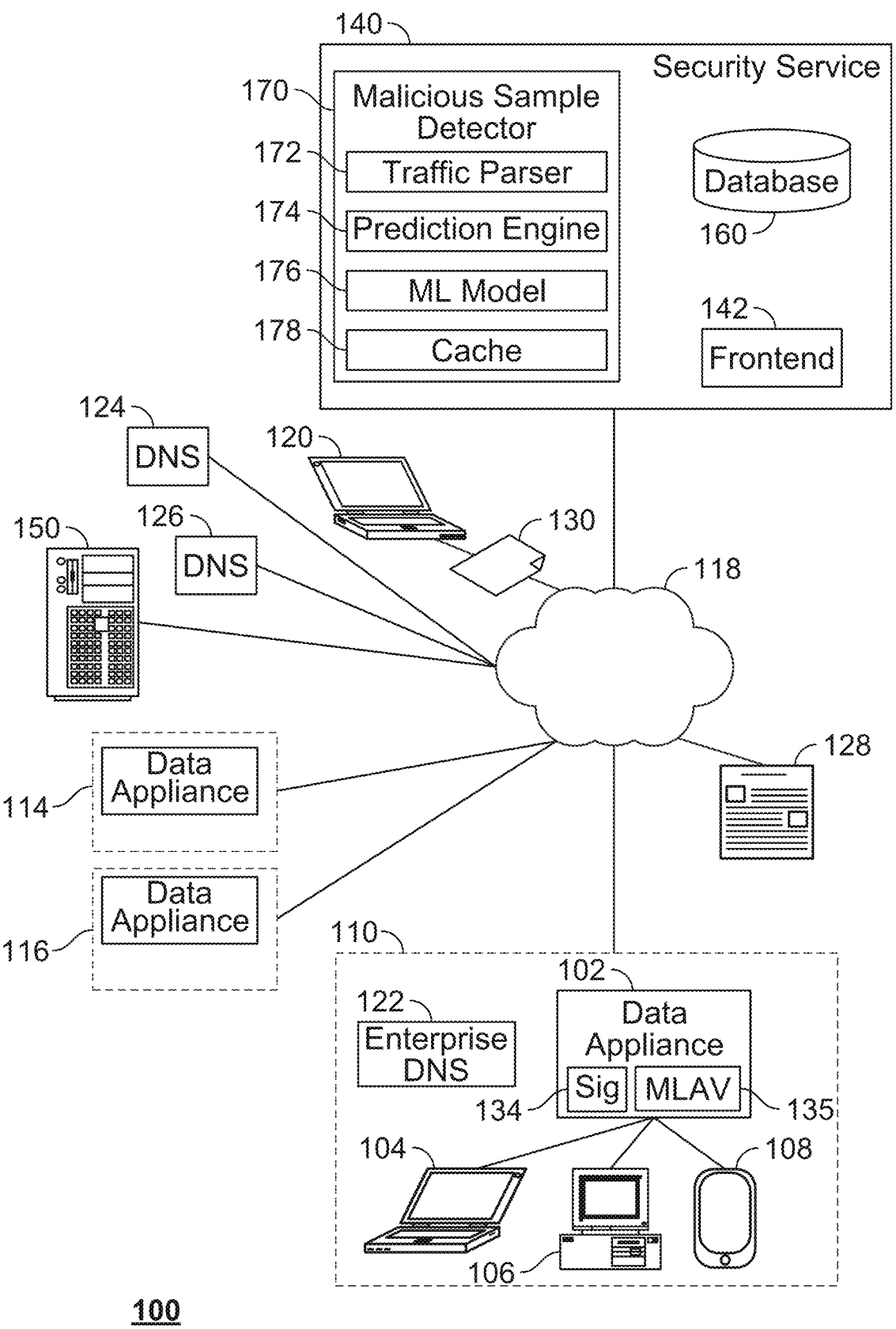
FIG. 1 is a block diagram of an environment in which a malicious traffic is detected or suspected in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques.

For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content not just ports, IP addresses, and packets-using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls.

Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™ KVM/OpenStack (Centos/RHEL, Ubuntu®), and Amazon Web Services (AWS)).

For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Cloud Security

Security solutions are generally used to detect and block existing malware and patient-zero malware.

But there are times when signatures are not available and malware cannot be detected by existing inline solutions, including inline machine learning (ML) solutions (e.g., inline machine learning anti-virus (MLAV), such as further described below). In such cases, cloud resources can be utilized to provide additional security analysis resources.

Thus, there is a need to provide solutions that facilitate an effective and efficient use of both local resources (e.g., on a security platform, such as a network gateway firewall (NGFW), also referred to herein as a firewall) and cloud resources (e.g., a cloud security entity) for enhanced security detection.

Overview of Techniques for Machine Learning for Prioritizing Traffic in Multi-Purpose Inline Cloud Analysis (Mica) to Enhance Malware Detection To address these technical security challenges, a forwarding channel, which is referred to herein as a Multi-Purpose Inline Cloud Analysis (MICA) channel, is disclosed for providing enhanced security detection using a security platform and cloud-based security analysis (e.g., also referred to as cloud security analysis, such as using a cloud security entity).

However, there exists bandwidth limitations associated with use of such a forwarding channel (e.g., MICA channel) from a security platform (e.g., an inline security entity, such as a firewall) to a cloud security entity (e.g., a cloud-based security service, such as further described below).

For example, maintaining state for monitored sessions at a security platform utilizes various limited resources associated with the security platform, such as storage (e.g., memory and/or other storage) and CPU (e.g., processing cycles) at the security platform. As such, the security platform typically is configured to start dropping packets when reaching certain limitations/bandwidth issues. As such, these limitations/bandwidth issues can prevent the effective and efficient detection and blocking of malware, such as when signatures are not available, and the inline machine learning anti-virus (MLAV) model cannot detect the malware. Moreover, when packets are dropped due to bandwidth limitations in the MICA solution, customers of the security solution may not fully experience the benefits of the MICA detection solution.

As a result, not all sessions can generally be forwarded using the MICA channel to the cloud security entity. As such, there is a need to effectively and efficiently prioritize session traffic that is selected for forwarding using the MICA channel to the cloud security entity.

As an example, as will be further described below with respect to various embodiments, the disclosed techniques for prioritizing traffic in multi-purpose inline cloud analysis (MICA) to enhance malware detection can be based on applying certain criteria, such as whether the malicious session can be detected locally (e.g., based on signatures and/or based on use of local heuristic related techniques and/or machine learning (ML) techniques (MLT), such as the inline machine learning anti-virus (MLAV) model component executed locally on the security platform as further described below). As such, by applying this criteria along with potentially other criteria as further described below, the disclosed techniques can facilitate that the most critical traffic is forwarded through the MICA channel while less important traffic is dropped when a given bandwidth limit is reached.

Accordingly, various techniques for machine learning for prioritizing traffic in multi-purpose inline cloud analysis (MICA) to enhance malware detection are disclosed.

In some embodiments, a system, a process, and/or a computer program product for machine learning for prioritizing traffic in multi-purpose inline cloud analysis (MICA) to enhance malware detection includes processing a set of data for network security analysis to extract a file; determining that the file is to be offloaded to a cloud security entity for security processing based at least in part on a prefilter model that is implemented as a machine learning model; forwarding the file to the cloud security entity using a multi-purpose inline cloud analysis (MICA) channel; and performing an action in response to receiving a verdict from the cloud security entity.

For example, a MICA prefilter is disclosed that includes a machine learning (ML) model that is used to prioritize session traffic that is selected for forwarding using the MICA channel to the cloud security entity for further analysis (e.g., cloud-based inline security analysis, which can include one or more cloud security entities/components). The model is trained on a dataset of malicious and benign traffic to facilitate automated identification of potentially malicious traffic that would not be detected by local resources/components on the security platform (e.g., using the MLAV model and/or other signature, heuristic, and/or ML associated components executed locally on the security platform). As such, the disclosed MICA prefilter solution effectively and efficiently facilitates the forwarding of the most critical traffic through the MICA channel to the cloud security entity for further analysis (e.g., cloud-based inline security analysis, which can include one or more cloud security entities/components) while less important traffic can be dropped when certain thresholds/bandwidth limits are reached at the security platform.

In some embodiments, a system, a process, and/or a computer program product for generating a multi-purpose inline cloud analysis (MICA) prefilter model for execution on an inline security entity includes collecting samples, wherein the samples include a plurality of files of a predetermined file type; extracting features from each of the samples; determining a ground truth verdict and file size for each of the samples and relabeling the samples; splitting train, test, and validation (TTV) data based on traffic bytes, wherein a session count and file size for each sample is received as input; training the MICA prefilter model with each of the samples, wherein the samples are each weighted; and determining a threshold value for the MICA prefilter model.

As such, the disclosed techniques for machine learning for prioritizing traffic in MICA to enhance malware detection facilitate an effective and efficient selection of traffic for forwarding to the cloud security entity for further analysis (e.g., cloud-based inline security analysis, which can include one or more cloud security entities/components). As will be further described below, identifying false negatives of existing ML detection components (e.g., MLAV) executed locally on the security platform can be used for the disclosed enhanced MICA channel related solution. Also, the disclosed techniques can be efficiently implemented by using only a subset of the traffic associated with each monitored network traffic session at the security platform (e.g., a predetermined number of the first set of bytes) for performing the MICA prefiltering analysis and forwarding decision (e.g., before and/or while the MLAV model can be performing automated ML analysis of the monitored session in parallel locally on the security platform). Moreover, the disclosed techniques facilitate an overall increased malware detection rate as further described below.

These and various other techniques for machine learning for prioritizing traffic in multi-purpose inline cloud analysis (MICA) to enhance malware detection will now be further described below with respect to various embodiments.

Example System Embodiments for Machine Learning for Prioritizing Traffic in Multi-Purpose Inline Cloud Analysis (Mica) to Enhance Malware Detection As used herein, a security platform or an inline security entity/platform may include a network node (e.g., a device) that enforces one or more security policies with respect to information such as network traffic, files, etc. As an example, a security platform or an inline security entity/platform may be a firewall. As another example, a security platform or an inline security entity/platform may be implemented as a router, a switch, a DNS resolver, a computer, a tablet, a laptop, a smartphone, etc. Various other devices may be implemented as a security platform or an inline security entity/platform. As another example, a security platform or an inline security entity/platform may be implemented as an application running on a device, such as an anti-malware application. As another example, a security platform or an inline security entity/platform may be implemented as an application running on a container or a virtual machine (VM).

According to some related art systems, a task is communicated to another system (e.g., a cloud system/service) via a management plane. A cloud service generally has more resources and greater processing power. Thus, local systems are often designed to offload at least some information or tasks to the cloud service (e.g., to preserve computational resources, storage, etc. on the local systems). For example, local systems are generally designed to offload to a cloud service the heavy compute process activities (e.g., examples of compute intensive operations can include applying various machine learning techniques (MLT) for malware sample analysis, etc.). The local system may perform low latency services but will offload certain processing operations to the cloud service. The related art local system comprises a data plane on which a plurality of applications is running and a management plane that facilitates communications between the plurality of applications and another system, such as a cloud service (e.g., a cloud detection service).

However, as similarly discussed above, such related art systems are typically inefficient, because the management plane serves as a bottleneck. For each communication between the related art system and the cloud system, the data plane of the related art system sends a communication (e.g., the task) to the management plane, which in turn sends the communication to the cloud system. Thus, the communication of the task from the related art system to the cloud system requires two communications/hops.

To solve such inefficiencies of the related art systems that mediate communications between the data plane of a local system and a cloud service to which the process running on the data plane offloads information or tasks, other related art systems include a shared memory to facilitate inter-process communications (e.g., communication of messages, such as messages corresponding to tasks). A plurality of tasks (e.g., applications) running on the system use a shared memory, such as to communicate with another process (e.g., a daemon running on a data plane of the system to facilitate communication with another system, such as a cloud service). For example, the plurality of tasks respectively writes request messages to a shared memory, and the daemon retrieves the request message and communicates with the cloud service. As another example, in response to receiving a response message (also referred to herein as a result message), the daemon writes the response message to the shared memory and the applicable task may read the response message from the shared memory. Some related art systems may comprise a forward-direction shared memory and a reverse direction shared memory for facilitating communication of data (e.g., messages) from the data plane of the local system to the other system (e.g., the cloud service).

As used herein, a forward direction shared memory may include a memory in which messages (e.g., request messages) are written by one or more of the applications for reading by a process (e.g., a daemon, also referred to herein as the WIFClient) running on a data plane of the system on which the plurality of applications is executed (e.g., an inline security entity). The process (e.g., the daemon) may be responsible for transferring the messages from the system (e.g., the messages generated by the plurality of applications) to a cloud system (e.g., a cloud security entity), and to receive the verdict (e.g., a result of the message from the cloud system and provide the verdict to the corresponding application of the plurality of applications (e.g., the application that wrote the message to the forward direction shared memory)).

As will be further described below with respect to various embodiments, the WIFClient is a component that facilitates communication via a single communication channel with the shared file manager (e.g., FileMgr service, such as further described below with respect to various embodiments) that can then efficiently utilize distinct channels for communications with each of the cloud detection services for performing the disclosed techniques for a data centric approach for supporting multiple inline cloud services.

As used herein, a reverse direction shared memory may include a memory in which messages (e.g., result messages) are written by the process running on the data plane of the system on which the plurality of applications is executed (e.g., the inline security entity). The process may be responsible for receiving the verdict (e.g., a result of the message from the cloud system) and provide the verdict to the corresponding application of the plurality of applications (e.g., the application that wrote the message to the forward direction shared memory). The process provides the verdict to the corresponding application by writing a corresponding message to the reverse direction shared memory, and the corresponding application may receive the verdict based on a reading of the reverse direction shared memory.

According to various embodiments, the plurality of applications may be written or compiled in different programming languages. At least a subset of the plurality of applications provides corresponding local services at a system (e.g., an inline security entity), and the local services are configured to offload tasks to a cloud service (e.g., a cloud system that provides a plurality of corresponding cloud services). For example, tasks that write request messages to the shared memory (e.g., the forward-direction shared memory) may be written in C, and the application that retrieves the request message from the shared memory and facilitates communication with the cloud service may be written in the Go programming language (also referred to herein as Golang). The use of a shared memory in connection with communicating requests from the data plane to the cloud service provides a more seamless manner for passing messages from applications written in a first language to applications written in a second language. For example, developers are freed from having to develop interfaces by which the applications communicate with one another.

Because a plurality of local services (e.g., running at the inline security entity) write tasks (e.g., request messages) to the multi-application shared-memory (e.g., the forward-direction shared memory), the memory constraints of the shared-memory can cause the process (e.g., the application) that retrieves the request message from the shared memory and facilitates communication with the cloud service to be overloaded. According to various embodiments, the system enforces a quota for data that a particular local service can write to the shared memory. Each local service may have its own corresponding quota, or various subsets of local services may be grouped and share a group quota for the particular group/subset of local services.

In some embodiments, an inline security entity (e.g., security platform, such as an NGFW/firewall) has a plurality of processes (e.g., tasks, applications, etc.) running thereon, which respectively correspond to services provided by the cloud service entity. For example, each service running on the cloud service entity corresponds to (e.g., services) a service running at the inline security entity. The inline security entity determines whether to offload processing of certain data to the cloud service entity. For example, the inline security entity determines an extent to which data processing is to be performed locally or offloaded for processing to the cloud service entity. The inline security entity is configured to perform, for example, low latency services, and offloads processing for compute intensive services (e.g., if processing data is to exceed a predefined processing threshold, the processing is offloaded; or if the type of processing data matches processing that is mapped to the cloud service entity, the processing is offloaded; etc.). In response to determining to offload processing certain data to the cloud service entity, the service running on the inline security entity writes a message (e.g., a request for the data to be processed by the cloud service entity) to the multi-application shared memory.

In some embodiments, the multi-application shared memory(ies) (e.g., the forward direction shared memory, the reverse direction shared memory, etc.) are a ring buffer.

According to various embodiments, one or more data planes of the inline security entity are configured to communicate with the cloud service. For example, a data plane communicates directly with the cloud service entity, or otherwise communicates with the cloud service entity in a manner that does not require the management plane to communicate data processing requests (e.g., request messages) to the cloud service entity. The system thus reduces latency by relying on the data plane to connect to the cloud (e.g., the WIFClient that is in communication with the FileMgr that then communicates with each of the cloud detection services using distinct communication channels, such as will be further described below).

The inline security entity receives data from another system or service. For example, the inline security entity comprises/corresponds to a security platform/firewall that mediates traffic across a network. In some embodiments, the inline security entity has a cache that may be used to support inline processing (e.g., local processing at the inline security entity) of the data (e.g., the traffic data). For example, the system may use the cache in connection with storing models, previously detected patterns/fingerprints, or other store results from processing traffic such as results previously computed inline, or verdicts (e.g., results) received from the cloud service entity. In response to receiving data, the system (e.g., the inline security entity) queries its cache to determine whether the cache has sufficient information available for the system to perform local processing of the data (e.g., low-latency computes with respect to such data). For example, the system determines whether the cache stores a mapping (e.g., a blacklist) of fingerprint (or hash) to malicious files (or malicious traffic) that includes the characteristics of the data received and being locally analyzed by the system. As another example, the system determines whether the cache stores a mapping (e.g., a whitelist) of fingerprint (or hash) to benign files (or malicious traffic) that includes the characteristics of the data received and being locally analyzed by the system. If the mapping(s) in the cache do not store a fingerprint for the data being analyzed, the system determines whether to offload processing (e.g., analysis of whether the traffic is malicious) to the cloud service. In some embodiments, the determination of whether to offload processing to the cloud service is performed at the data plane(s) of the system (e.g., the inline security entity), and the tasks running on the data plane(s) connect to the cloud service to request the service and receive the verdict.

In response to receiving the request message from the data plane of the local system, a process running on the cloud-side architecture determines the service that the request message pertains to. For example, the cloud service (e.g., cloud security service or also referred to herein as security service) determines the service/processing to be performed at the cloud service based on the request message (e.g., the task/process from which the request message originated). The cloud service may determine the service/processing to be performed based on the connector (e.g., the connection interface between the data plane(s) of the local system and the cloud service) via which the request message was received. In response to determining the service/processing to be performed with respect to data for the request message, the cloud service obtains the data, allocates the processing to a worker, and the worker connects to a back-end service to perform the processing. In response to the processing being completed by the cloud service, the cloud service sends a verdict of the processing to the other system (e.g., the inline security entity). The verdict may be a result or response message corresponding to the request message. In some embodiments, the cloud security entity sends to the inline security entity an update for the inline security entity to store in its cache. For example, the cloud security entity sends to the inline security entity a signature for the data that was processed and a corresponding verdict (e.g., an indication of whether the data is malicious traffic or benign traffic, etc.). Upon update of the cache at the inline security entity, the inline security entity may use such information in connection with processing subsequent data (e.g., traffic) matching the signature associated with the update.

In some embodiments, the system comprises a plurality of shared memories. For example, the system comprises a first buffer that provides an indication of whether a message (e.g., a request message) is available for processing, and a second buffer that provides a message queue. The system uses indexes for the shared memories in connection with flow control, such as to ensure that the reader side (e.g., the daemon running on the data plane and facilitating communication with the cloud system) is not overwhelmed by request messages from the plurality of applications running on the data plane(s). The flow control of messages/requests may be facilitated by using metadata counters.

In connection with the process/task (e.g., the message writer) requesting service from the cloud system writing a request message into the shared memory, the system increases a message-in index (e.g., the write index) counter. The system uses the message-in index counter in connection with determining whether a request message is to be written into the shared memory or whether the message-reader side is overwhelmed with a volume of requests from the processes/tasks (e.g., applications) that share the shared memory. For example, if the message-reader side is too slow in processing the request messages, the buffer of request messages in the queue may become full/used up. The write index indicates the total number of messages in the buffer.

In connection with processing the request messages written to the shared memory, the system increases a message-out index (e.g., the read index) counter in response to the process on the reader-side of the shared memory (e.g., the daemon, such as the WIFClient) reading the request message. For example, the reading of the request message by the process on the message-reader side is deemed to be indicative of the system having processed the request message and offloaded the processing to the cloud system. The system uses the message-out index counter in connection with determining whether a request message is to be written into the shared memory or whether the message-reader side is overwhelmed with a volume of requests from the processes/tasks (e.g., applications) that share the shared memory.

In some embodiments, the system uses the message-out index counter and the message-in index counter to determine whether to process a particular request message. For example, the system uses the message-out index counter and the message-in index counter to determine whether to write the particular request message to the buffer (e.g., the shared memory). The system may compare the message-out index counter and the message-in index counter to determine whether the buffer has sufficient capacity for new request messages. For example, if the difference between the message-in index counter and the message-out index counter is greater than the allocated shared memory (or greater than the number of messages that can be written to the allocated shared memory), then the system (e.g., the message writer task/process) does not write the new request message to the shared memory or the system does not provide or otherwise blocks the corresponding service.

In some embodiments, the various processes (e.g., applications, services, etc.) running on the system that share the shared memory have quotas indicating an amount/number of request messages that the various processes are permitted to have pending in the shared buffer. In some embodiments, each of the plurality of processes have a corresponding quota. In some embodiments, a subset of the plurality of processes are grouped, and each group has a corresponding quota shared among the processes in the particular group. The system stores a message-in index and a message-out index for each process (or group of processes, as applicable). In connection with writing a new request message to the shared memory, the system obtains the message-in index counter and the message-out index counter for the particular process (e.g., or group of processes, as applicable) requesting the service (e.g., requesting to offload the processing to the cloud service) and determines whether the allocated space in the shared memory for the process (e.g., the number of messages that may be written to the shared memory based on the corresponding quota) has sufficient space for the new request message. For example, the system determines the allocated space in the shared memory for a particular process based at least in part on multiplying a predefined number of available spaces for request messages by the quota corresponding to the particular process (or group of processes, as applicable). If the difference between the message-in index counter and the message-out index counter is greater than the product of the available spaces for request messages and the corresponding quota for the particular process, then the allocated space in the shared memory does not have sufficient capacity for new request messages until the message-reader side processes (e.g., reads out) the request messages (e.g., sends the requests to the cloud system for processing). In some implementations, in response to determining that the allocated space in the shared memory does not have sufficient capacity for new request messages, the system restricts writing of new request messages (e.g., the process is controlled to not write a new request message to the shared memory, or a corresponding service is blocked).

In some embodiments, the quotas respectively allocated to various processes sharing the shared memory are different. For example, certain services (e.g., certain processes/applications) may have higher quotas than other services. As an illustrative example, services that process streams of data (e.g., services for which a flow of traffic should not be disrupted), such as DLP services, may have a higher quota than other services. In some embodiments, a DLP service is provided a quota of 50% of the shared memory, and the other 50% of the shared memory is allocated across other services running on the inline security entity.

In some embodiments, the system dynamically adjusts quotas for one or more services (or group of services, as applicable). For example, the system monitors usage of the services and determines whether a particular service has excess or insufficient capacity relative to its usage and adjusts the quota for the particular service accordingly. If the system determines that a particular service has insufficient capacity in the shared memory, the system may determine whether another service has excess capacity which may be re-allocated to the particular service. If the system determines that a particular service has excess capacity in the shared memory relative to its usage, the system determines whether to re-allocate the excess capacity to another service. The system may monitor usage of a service based on monitoring traffic for the service or monitoring the usage of allocated space in the shared memory by the service.

Various embodiments use indexing associated with the shared memory to determine the number of buffered requests pending for the message-reader side (e.g., the daemon running on a data plane of the inline security entity and facilitating communication/offloading of requests to a cloud system). For example, the system uses the indexing to determine how much of the buffer (e.g., how many request messages) has not been consumed by the message-reader side process.

FIG. 1 is a block diagram of an environment in which a malicious traffic is detected or suspected in accordance with some embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is a security platform, also referred to herein as an inline security entity. Data appliance 102 performs low-latency processing/analysis of incoming data (e.g., traffic data) and determines whether to offload any processing of the incoming data to a cloud system, such as security service 140.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security service 140 (e.g., a cloud-based security service, also referred to as a cloud service or a cloud security service). Security service 140 may be a cloud system such as a cloud service security entity. Security service 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security service 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security service 140 can be implemented across a scalable infrastructure comprising multiple such servers, solid state drives, and/or other applicable high-performance hardware. Security service 140 can comprise several distributed components, including components provided by one or more third parties. For example, portions or all of security service 140 can be implemented using the Amazon Elastic Compute Cloud (EC2) and/or Amazon Simple Storage Service (S3). Further, as with data appliance 102, whenever security service 140 is referred to as performing a task, such as storing data or processing data, it is to be understood that a sub-component or multiple sub-components of security service 140 (whether individually or in cooperation with third party components) may cooperate to perform that task. As one example, security service 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security service 140 but may also be provided by a third party. As one example, the virtual machine server can rely on EC2, with the remainder portions of security service 140 provided by dedicated hardware owned by and under the control of the operator of security service 140.

In some embodiments, system 100 uses security service 140 to perform processing with respect to traffic data off-loaded by data appliance 102. Security service 140 provides one or more services to data appliance 102, client device 120, etc. Examples of services provided by security service 140 (e.g., the cloud service entity) include a data loss prevention (DLP) service, an application cloud engine (ACE) service (e.g., a service for identifying a type of application based on a pattern or fingerprint of traffic), Machine learning Command Control (MLC2) service, an advanced URL filtering (AUF) service, a threat detection service, an enterprise data leak service (e.g., detecting data leaks or identifying sources of leaks), and an Internet of Things (IoT) service. Various other services can similarly be implemented, including, for example, Advanced Wildfire (e.g., a commercially available inline machine learning-based engine that prevents malicious content in common file types, which is commercially available from Palo Alto Networks, Inc., headquartered in Santa Clara, CA).

In some embodiments, system 100 (e.g., malicious sample detector 170, security service 140, etc.) trains a detection model to detect exploits (e.g., malicious samples), malicious traffic, and/or other malicious/nefarious/undesirable activity/behavior, etc. Security service 140 may store blacklists, whitelists, etc. with respect to data (e.g., mappings of signatures to malicious files, etc.). In response to processing traffic data, security service 140 may send an update to inline security entities, such as data appliance 102. For example, security service 140 provides an update to a mapping of signatures to malicious files, an update to a mapping of signatures to benign files, etc.

According to various embodiments, the model(s) trained by system 100 (e.g., security service 140) are obtained using a machine learning process (e.g., implementing various machine learning techniques (MLT)). Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) are a combined feature vector or set of feature vectors and based on the combined feature vector or set of feature vectors the classifier model determines whether the corresponding traffic (e.g., input string) is malicious, or a likelihood that the traffic is malicious (e.g., whether the traffic is exploit traffic).

According to various embodiments, security service 140 includes a malicious sample detector 170. Malicious sample detector 170 is used in connection with determining whether a sample (e.g., traffic data) is malicious. In response to receiving a sample (e.g., an input string such as an input string input in connection with a log-in attempt), malicious sample detector 170 analyzes the sample (e.g., the input string), and determines whether the sample is malicious. For example, malicious sample detector 170 determines one or more feature vectors for the sample (e.g., a combined feature vector), and uses a model to determine (e.g., predict) whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, ML model 176, and/or cache 178.

Traffic parser 172 is used in connection with determining (e.g., isolating) one or more attributes associated with a sample being analyzed. As an example, in the case of a file, traffic parser 172 can parse/extract information from the file, such as from a header of the file. The information obtained from the file may include libraries, functions, or files invoked/called by the file being analyzed, an order of calls, etc. As another example, in the case of an input string, traffic parser 172 determines sets of alphanumeric characters or values associated with the input string. In some embodiments, traffic parser 172 obtains one or more attributes associated with (e.g., from) the input string. For example, traffic parser 172 obtains from the input string one or more patterns (e.g., a pattern of alphanumeric characters), one or more sets of alphanumeric characters, one or more commands, one or more pointers or links, one or more IP addresses, etc.

In some embodiments, one or more feature vectors corresponding to the input string are determined by malicious sample detector 170 (e.g., traffic parser 172 or prediction engine 174). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, traffic parser 172 uses the one or more attributes associated with the sample in connection with determining the one or more feature vectors. In some implementations, traffic parser 172 determines a combined feature vector based at least in part on the one or more feature vectors corresponding to the sample. As an example, a set of one or more feature vectors is determined (e.g., set or defined) based at least in part on the model used to detect exploits. Malicious sample detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from files, or SQL and command injection strings, and (ii) using an algorithmic-based feature extraction to filter out described features from a set of raw input data.

In response to receiving a sample for which malicious sample detector 170 is to determine whether the sample is malicious (or a likelihood that the sample is malicious), malicious sample detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious sample detector 170 (e.g., traffic parser 172) provides (or makes accessible) the one or more feature vectors to prediction engine 174 (e.g., in connection with obtaining a prediction of whether the sample is malicious). As another example, malicious sample detector 170 (e.g., traffic parser 172) stores the one or more feature vectors such as in cache 178 or database 160.

In some embodiments, prediction engine 174 determines whether the sample is malicious based at least in part on one or more of (i) a mapping of samples to indications of whether the corresponding samples are malicious, (ii) a mapping of an identifier for a sample (e.g., a hash or other signature associated with the sample) to indications of whether the corresponding sample is malicious, and/or (iii) a classifier (e.g., a model trained using a machine learning process). In some embodiments, determining whether the sample based on identifiers to indications that the sample is malicious may be performed at data appliance 102, and for a sample for which an associated identifier is not stored in the mapping(s), data appliance 102 offloads processing of the sample to security service 140.

Prediction engine 174 is used to predict whether a sample is malicious. In some embodiments, prediction engine 174 determines (e.g., predicts) whether a received sample is malicious. According to various embodiments, prediction engine 174 determines whether a newly received sample is malicious based at least in part on characteristics/attributes pertaining to the sample (e.g., regex statements, information obtained from a file header, calls to libraries, APIs, etc.). For example, prediction engine 174 applies a machine learning model to determine whether the newly received sample is malicious. Applying the machine learning model to determine whether the sample is malicious may include prediction engine 174 querying machine learning model 176 (e.g., with information pertaining to the sample, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular sample is malicious. In some embodiments, prediction engine 174 receives information associated with whether the sample is malicious (e.g., an indication that the sample is malicious). For example, prediction engine 174 receives a result of a determination or analysis by machine learning model 176. In some embodiments, prediction engine 174 receives from machine learning model 176 an indication of a likelihood that the sample is malicious. In response to receiving the indication of the likelihood that the sample is malicious, prediction engine 174 determines (e.g., predicts) whether the sample is malicious based at least in part on the likelihood that the sample is malicious. For example, prediction engine 174 compares the likelihood that the sample is malicious to a likelihood threshold value. In response to a determination that the likelihood that the sample is malicious is greater than a likelihood threshold value, prediction engine 174 may deem (e.g., determine that) the sample to be malicious.

According to various embodiments, in response to prediction engine 174 determining that the received sample is malicious, security service 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a blacklist of samples (e.g., corresponding to malicious samples) such as in the case that the received sample is deemed to be malicious, or an update to a whitelist of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for a sample and perform a look up against a mapping of hashes/signatures to indications of whether samples are malicious/benign (e.g., query a whitelist and/or a blacklist). In some embodiments, the hash or signature uniquely identifies the sample.

Prediction engine 174 is used in connection with determining whether the sample (e.g., an input string) is malicious (e.g., determining a likelihood or prediction of whether the sample is malicious). Prediction engine 174 uses information pertaining to the sample (e.g., one or more attributes, patterns, etc.) in connection with determining whether the corresponding sample is malicious.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a blacklist, a whitelist, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical input strings and historical information, malicious sample detector 170 may deem the sample has not yet been analyzed and malicious sample detector 170 can invoke an analysis (e.g., a dynamic analysis) of the sample in connection with determining (e.g., predicting) whether the sample is malicious (e.g., malicious sample detector 170 can query a classifier based on the sample in connection with determining whether the sample is malicious). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on a whitelist or blacklist, etc.). Malicious sample detector 170 (e.g., traffic parser 172) may detect that a sample is newly analyzed in response to security service 140 receiving the sample from a security entity (e.g., a firewall) or endpoint within a network. For example, malicious sample detector 170 determines that a sample is newly analyzed contemporaneous with receipt of the sample by security service 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to query a classifier to analyze the sample or one or more feature vectors associated with the sample, etc.) in connection with determining whether the sample is malicious, and malicious sample detector 170 uses a classifier with respect to a set of feature vectors or a combined feature vector associated with characteristics or relationships of attributes or characteristics in the sample.

Machine learning model 176 predicts whether a sample (e.g., a newly received sample) is malicious based at least in part on a model. As an example, the model is pre-stored and/or pre-trained. The model can be trained using various machine learning processes. According to various embodiments, machine learning model 176 uses a relationship and/or pattern of attributes and/or characteristics, relationships among attributes or characteristics for the sample, and/or a training set to estimate whether the sample is malicious, such as to predict a likelihood that the sample is malicious. For example, machine learning model 176 uses a machine learning process to analyze a set of relationships between an indication of whether a sample is malicious (or benign), and one or more attributes pertaining to the sample and uses the set of relationships to generate a prediction model for predicting whether a particular sample is malicious. In some embodiments, in response to predicting that a particular sample is malicious, an association between the sample and the indication that the sample is malicious is stored such as at malicious sample detector 170 (e.g., cache 178). In some embodiments, in response to predicting a likelihood that a particular sample is malicious, an association between the sample and the likelihood that the sample is malicious is stored such as at malicious sample detector 170 (e.g., cache 178). Machine learning model 176 may provide the indication of whether a sample is malicious, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

Cache 178 stores information pertaining to a sample (e.g., an input string). In some embodiments, cache 178 stores mappings of indications of whether an input string is malicious (or likely malicious) to particular input strings, or mappings of indications of whether a sample is malicious (or likely malicious) to hashes or signatures corresponding to samples. Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104, will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjgfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security service 140.

In various embodiments, data appliance 102 includes signatures 134 (e.g., periodically updated from security service 140) and an inline machine learning antivirus (MLAV) module 135, which is configured to facilitate ML-based malware detection (e.g., the MLAV model component can be implemented as further described in U.S. Pat. Nos. 11,374,946 and 11,636,208, which are both incorporated herein by reference in their entirety). Using processing described in more detail below, security service 140 will determine (e.g., using a malicious file detector that may be similar to malicious sample detector 170 such as by using a machine learning model to detect/predict whether the file is malicious) whether a sample (e.g., a file) is a malicious file (or likely to be a malicious file) and provide a result back to data appliance 102 (e.g., "malicious file" or "benign file").

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and the data appliance may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

Figure 2A:
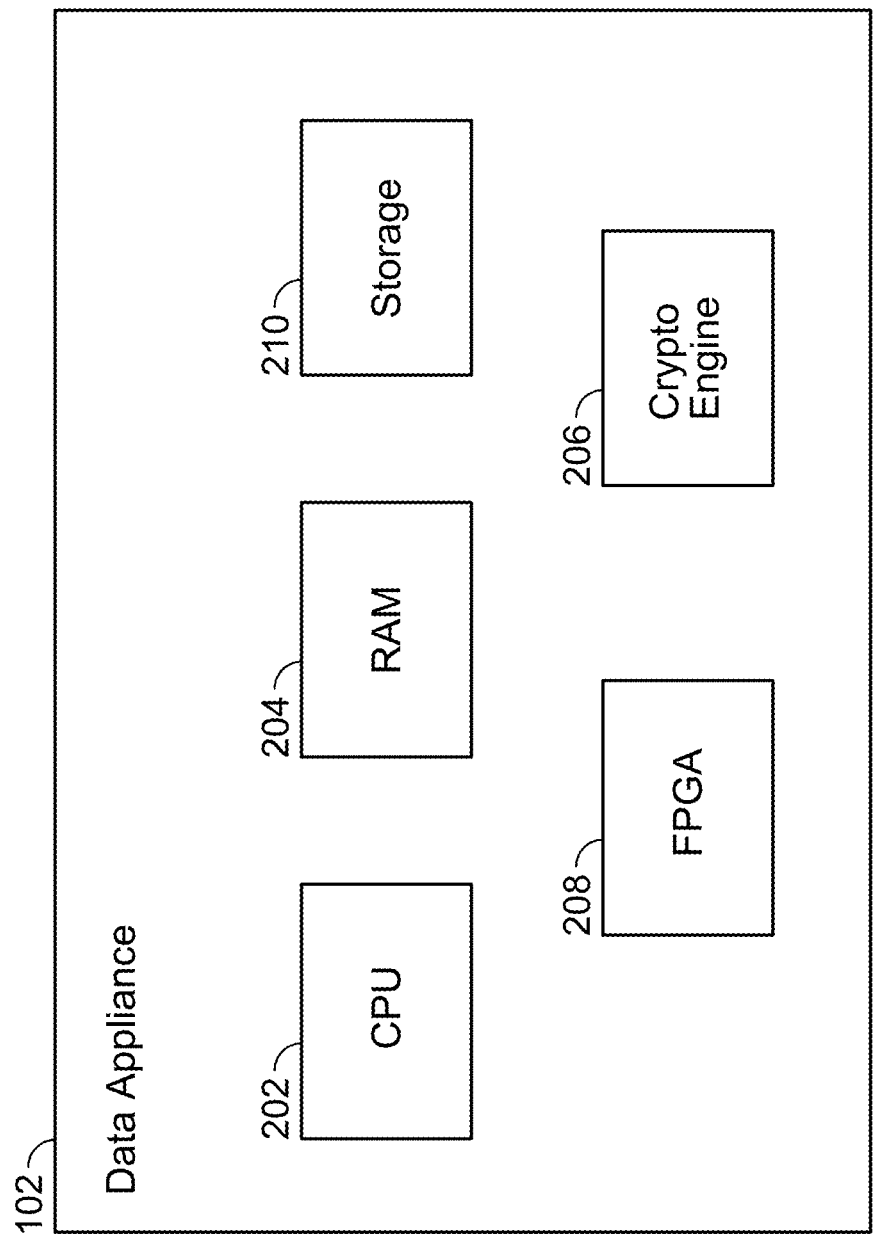
FIG. 2A illustrates an embodiment of a data appliance.

FIG. 2A illustrates an embodiment of a data appliance. An embodiment of an inline security entity, such as data appliance 102, is shown in FIG. 2A. The example shown is a representation of physical components that are included in data appliance 102, in various embodiments. Specifically, data appliance 102 includes a high-performance multi-core Central Processing Unit (CPU) 202 and Random Access Memory (RAM) 204. Data appliance 102 also includes a storage 210 (such as one or more hard disks or solid-state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general-purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
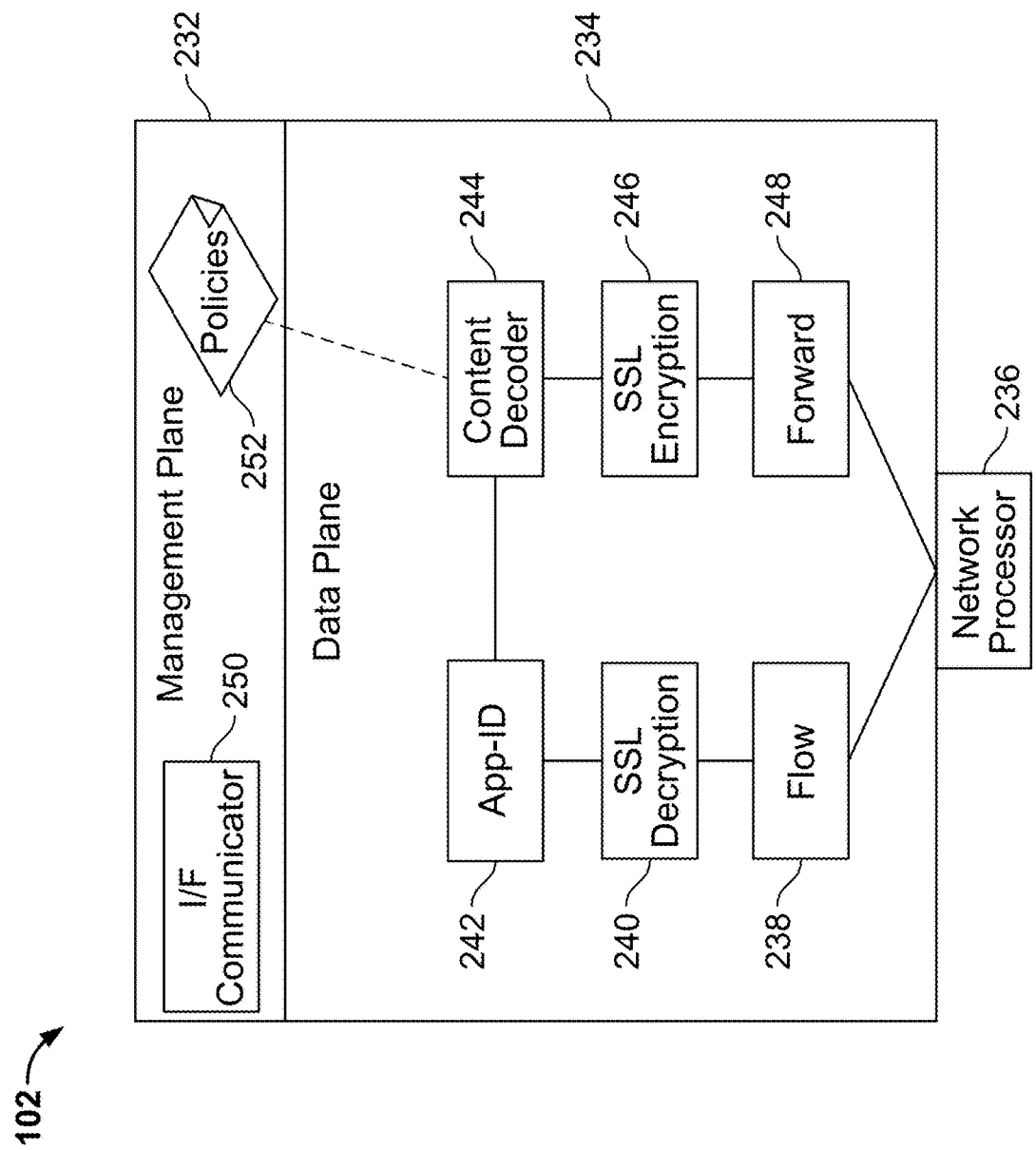
FIG. 2B is a functional diagram of logical components of an embodiment of a data appliance.

FIG. 2B is a functional diagram of logical components of an embodiment of a data appliance. The example shown is a representation of logical components that can be included in an inline security appliance, such as data appliance 102, in various embodiments. Unless otherwise specified, various logical components of data appliance 102 are generally implementable in a variety of ways, including as a set of one or more scripts (e.g., written in Go, Java, Python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling. The data plane may be further responsible for offloading processing to a cloud system/service, such as by communicating a request message to the cloud system/service without mediation or forwarding the message through the management plane, such as further described herein.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

Various other services may be implemented on data plane 234. The plurality of services/processes running on the data plane(s) of the inline security entity are configured to store request messages in a shared memory, and another process on the data plane (e.g., on a message reader side of the data plane), such as a daemon, reads the message and facilitates communication of the request message to the cloud security entity (e.g., security platform 140 of system 100). As described above, various embodiments enforce quotas with respect to a number of request messages that may be buffered/queued in the shared memory by a service/process running on the data plane of the inline security entity. Enforcing quotas prevents the message-reader side of the data plane(s) of inline security entity to be overwhelmed by request messages written by the plurality of processes to the same shared memory.

The data plane(s) of the inline security entity may connect to the cloud system. For example, the daemon running on the message-reader side of the shared memory (e.g., the WIFClient) connects to a process running on the cloud system (e.g., a file manager service) that receives the request message and determines the service to which the corresponding data is to be provided for cloud processing. For example, the file manager service running on the cloud system directs the data/request message to the corresponding service based on a determination of a connector via which the data plane is connected to the cloud system to communicate the request message to the cloud system, such as will be further described in detail below.

Figure 3:
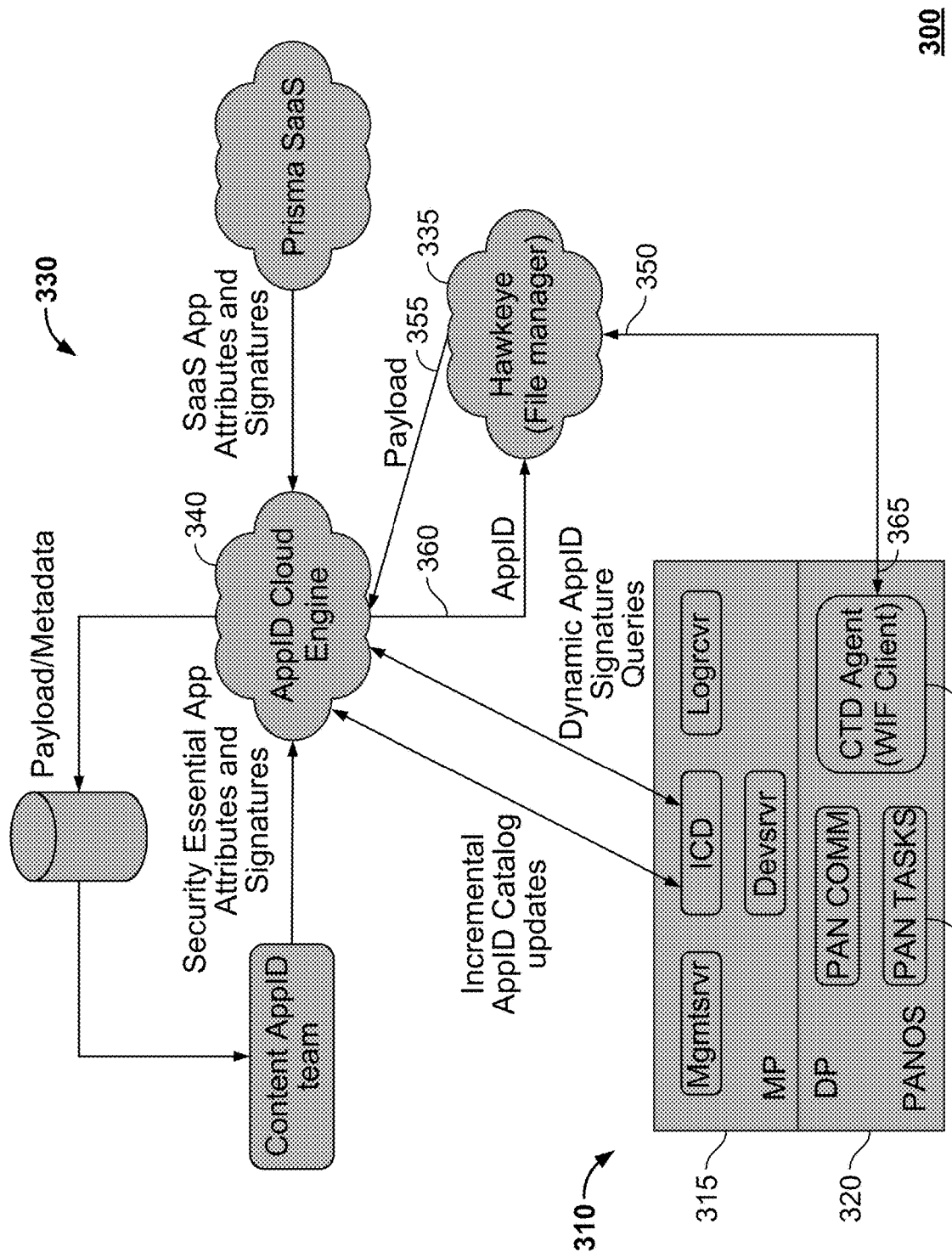
FIG. 3 is a block diagram of an environment in which a security platform offloads services to a cloud system in accordance with some embodiments.

FIG. 3 is a block diagram of an environment in which a security platform offloads services to a cloud system in accordance with some embodiments. In the example shown, a security platform, shown as an inline security entity 310, communicates with cloud system 330 (e.g., associated with a security service). Inline security entity 310 may receive traffic data, such as across a network being monitored/protected, and inline security entity 310 selectively locally processes (e.g., analyzes) the traffic data or offloads processing of the traffic data to cloud system 330.

In some embodiments, inline security entity 310 comprises management plane 315 and data plane 320. Inline security entity 310 may provide a plurality of services, which are shown as PAN tasks 322. The plurality of services may correspond to a plurality of processes or applications running on data plane 320. In response to inline security entity 310 (e.g., the corresponding service) determining to offload processing to cloud system 330 (e.g., the cloud security entity), the corresponding process (e.g., a task of PAN tasks 322) writes a request message to a shared memory (e.g., a local memory to inline security entity 310) that is shared among the plurality of services. In response to the request message being written to the shared memory, a process (e.g., shown as the CTD agent 324 or WIFClient) running on a message-reader side of data plane 320 reads the message and communicates the message to cloud system 330.

In response to reading the request message from the shared memory, the WIFClient (e.g., the daemon process running on data plane 320) connects to cloud system 330. In the example shown, the WIFClient connects to file manager service 335 of cloud system 330. For example, at step 350, the WIFClient communicates the request message to file manager (FileMgr) service 335.

In response to receiving the request message from the WIFClient, file manager service 335 determines the particular service provided by cloud system 330 to which file manager service 335 is to forward the request message for cloud processing, which can be implemented using a data centric approach for supporting multiple inline cloud services as will be further described below with respect to various embodiments. In the example shown, file manager service 335 determines that the data for the request message is to be processed by the APP-ID Cloud Engine (ACE) service 340. The ACE service 340 may identify a particular application to which traffic data corresponds, such as based on a fingerprint of the traffic, etc. In response to determining that the data is to be processed by ACE service 340, at 355, file manager service 335 sends the request message/data to ACE service 340.

In response to receiving the request message from file manager service 335, ACE service 340 processes the data for the request message. For example, ACE service 340 classifies the data to determine an application to which the data corresponds. ACE service 340 may classify the data using a model (e.g., a model trained using machine learning processes) to predict the application. In response to determining the application to which the data corresponds, at 360, ACE service 340 provides file manager service 335 with an indication of the application to which the data corresponds (e.g., an application identifier, or App-ID).

In response to receiving the result (e.g., the verdict) from the processing of the data using ACE service 340, at 365, file manager service 335 provides the result (e.g., a result message) to the inline security entity. For example, file manager service 335 communicates the result to the WIFClient running on 320. In response to receiving the result from file manager service 335, the WIFClient stores information pertaining to the result to a shared memory (e.g., a reverse-direction shared memory), which is shared by the plurality of services (e.g., PAN tasks 322) running on data plane 320. For example, in the case of the reverse-direction shared memory, the WIFClient is the only message writer to the reverse-direction shared memory and the PAN tasks 322 correspond to a plurality of message readers from the reverse-direction shared memory. Because the reverse-shared memory only has one corresponding message writer (e.g., the WIFClient), the plurality of message readers (e.g., PAN tasks 322) are not overwhelmed by the volume of messages. Accordingly, in various embodiments, the reverse-direction communication does not implement quotas or indexing of a number of messages written (e.g., by the WIFClient) to the shared memory or a number of messages read from the shared memory (e.g., by PAN tasks 322).

Figure 4:
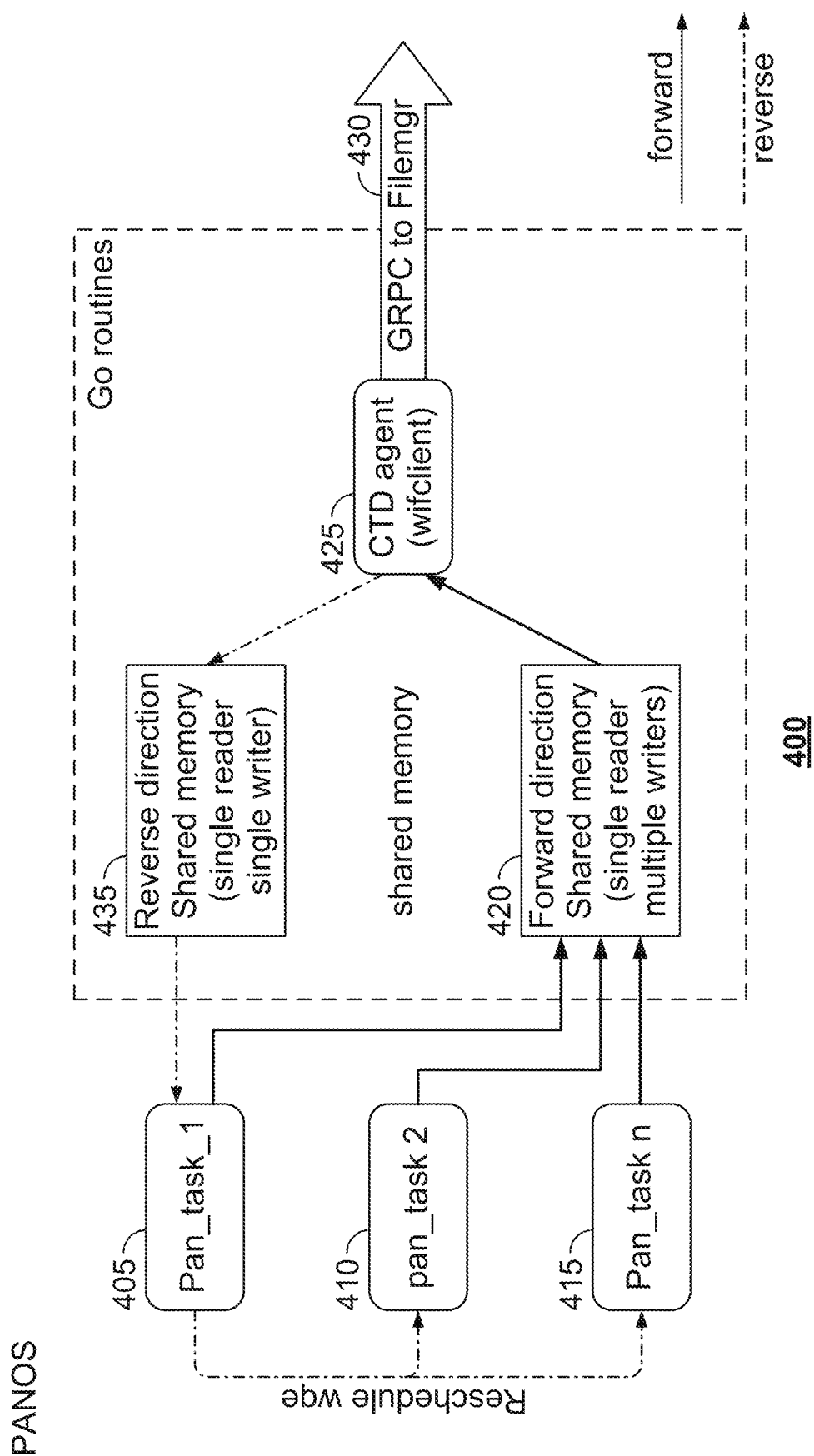
FIG. 4 illustrates a processing of data on a data plane of a security platform in accordance with some embodiments.

FIG. 4 illustrates a processing of data on a data plane of a security platform in accordance with some embodiments. In the example shown, data plane 400 has a plurality of services (e.g., applications) running, including service 405 (e.g., Pan_task_1), service 410 (pan_task_2), and up to service 415 (e.g., Pan_task n). Services 405, 410, and 415 share a shared memory 420 to communicate requests to a cloud system, such as in connection with offloading processing to the cloud system. In some embodiments, data plane 400 has N services that run on data plane 400 and share shared memory 420. N is a positive integer.

As illustrated in FIG. 4, service 405, 410, and 415 write request messages to shared memory 420. Shared memory 420 may also be referred to as the forward-direction shared memory. The system uses shared memory 420 to queue messages for offloading data from a plurality of local services (e.g., service 405, 410, and 415) to a cloud system (e.g., of a security service). As an example, shared memory has a single reader (e.g., WIFClient 425) and multiple writers (e.g., the multiple writers are service 405, 410, and 415).

Data plane 400 further comprises a process (e.g., WIFClient 425) that reads request messages from shared memory 420 and facilitates communication with the cloud system for offloading the processing of the data to the cloud system. WIFClient 425 reads a request message from the queue in shared memory 420 and connects to the cloud system. WIFClient 430 may communicate the request message to the cloud system (e.g., a file manager service running on the cloud system) via a gRPC Remote Procedure Calls (GRPC).

The cloud system processes the data for the request message and communicates a result message (e.g., a verdict) to the inline security entity. In some embodiments, the cloud system provides the result message to WIFClient 425. In response to receiving the result message, WIFClient 425 writes the result message, or information pertaining to the result message, to shared memory 435. Shared memory 435 may also be referred to as the reverse-direction shared memory. In the example shown, shared memory 435 has one message writer (e.g., WIFClient 425) and one message reader (e.g., service 405). In response to WIFClient 425 writing the result message to shared memory 435, service 405 retrieves the result message and forwards the result to the corresponding service. As an example, the result may have associated metadata that indicates the service that requested the processing corresponding to the result, or an identifier associated with the request message from which the system can determine the service from which the request message originated. In some embodiments, services 405, 410, and/or 415 are configured to read the result directly from shared memory 435 (e.g., in which case shared memory 435 has a plurality of message readers).

Figure 5:
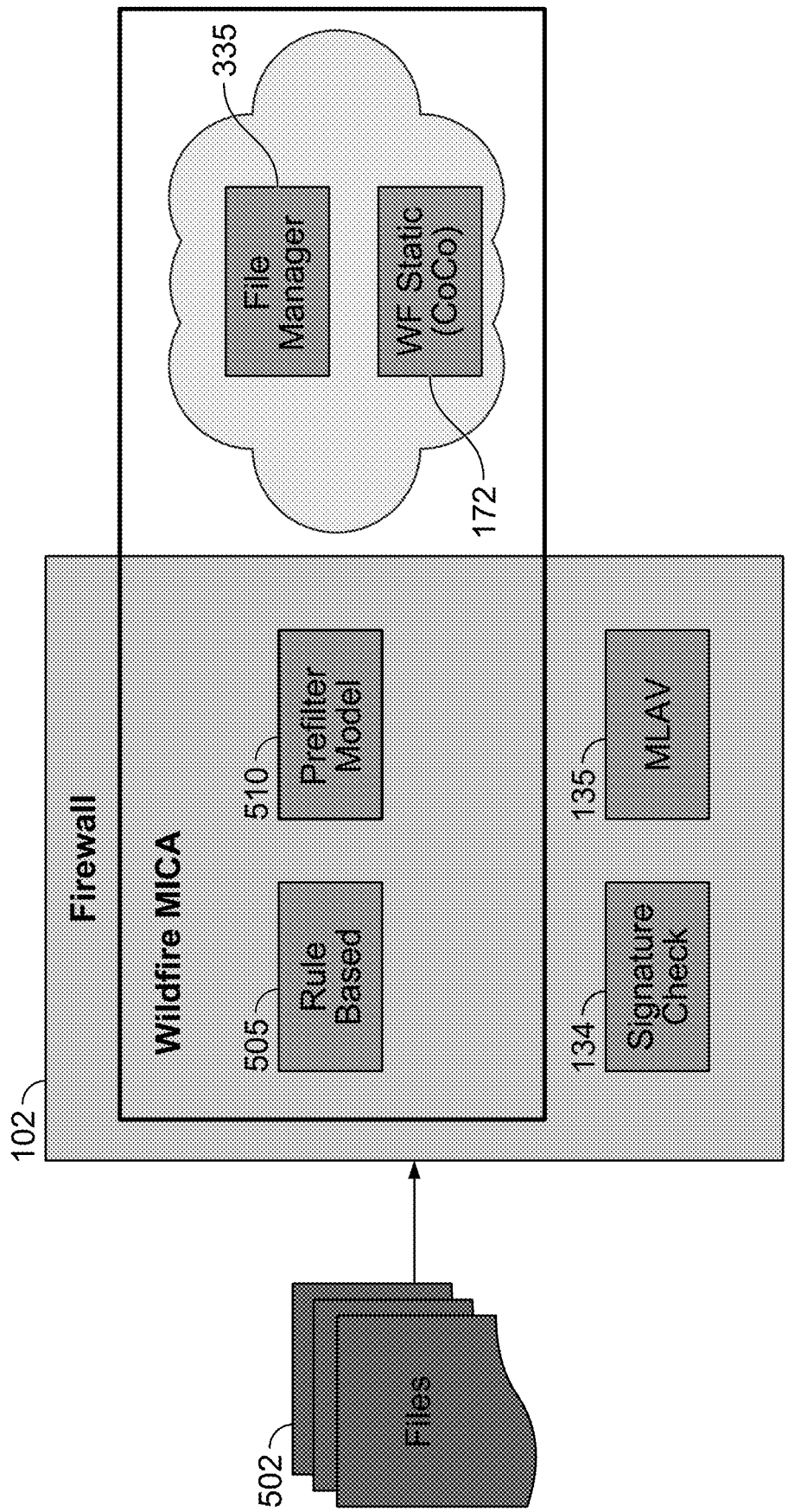
FIG. 5 is a block diagram of a high-level architecture for machine learning for prioritizing traffic in multi-purpose inline cloud analysis (MICA) to enhance malware detection in accordance with some embodiments.

Applying a Mica Prefilter Model for Machine Learning for Prioritizing Traffic for Further Cloud Security Analysis FIG. 5 is a block diagram of a high-level architecture for machine learning for prioritizing traffic in multi-purpose inline cloud analysis (MICA) to enhance malware detection in accordance with some embodiments.

Referring to FIG. 5, files 502 (e.g., packets associated with a plurality of distinct sessions, which can include files) are received at a firewall 102 (e.g., also referred to herein as a security platform) that is monitoring network traffic, such as similarly described above with respect to FIG. 1. The firewall includes signature check component 134 that detects potential malware based on signatures as similarly described above with respect to FIG. 1.

As also shown in FIG. 5, the firewall also includes inline machine learning anti-virus (MLAV) model component 135 that detects potential malware based on an inline malware detection using a machine learning model as similarly described above with respect to FIG. 1. In an example implementation, the MLAV model component is a lightweight ML model executed on the security platform/firewall that can be implemented based on n-grams and header features using XGBoost (e.g., the MHLAV model component can be implemented as further described in U.S. Pat. Nos. 11,374,946 and 11,636,208, which are both incorporated herein by reference in their entirety).

As similarly described above, certain malware (e.g., patient zero malware or other malware) can evade detection by the signature check and MLAV components. As such, certain files 502 can be forwarded using the disclosed MICA channel via file manager 335 to a cloud security entity shown as Wildfire static analysis entity 172 (e.g., Wildfire is a cloud security service that is commercially available from Palo Alto Networks, Inc., which is headquartered in Santa Clara, CA) as similarly described above with respect to FIG. 1. The cloud security entity shown at 172 can then perform a more powerful cloud-based machine learning analysis. In this example implementation, the cloud security entity shown at 172 provides an API to support Multi-Purpose Inline Cloud Analysis (MICA). For example, the MICA API is designed to facilitate uploading of files (e.g., Windows PE files and/or other files can similarly be supported) for cloud-based security analysis using static-based machine learning (ML) analysis and to then automatically return a verdict based on results of ML-based static analysis of the sample.

To address these technical security challenges, a forwarding channel, which is referred to herein as a Multi-Purpose Inline Cloud Analysis (MICA) channel, is disclosed for providing enhanced security detection using a security platform and cloud-based security analysis (e.g., also referred to as cloud security analysis, such as using a cloud security entity).

However, there exists bandwidth limitations associated with use of such a forwarding channel (e.g., shown as the Wildfire MICA channel in FIG. 5) from a security platform (e.g., an inline security entity, such as a firewall) to a cloud security entity (e.g., a cloud-based security service, such as shown as the Wildfire Static cloud entity in FIG. 5).

For example, maintaining state for monitored sessions at a security platform utilizes various limited resources associated with the security platform, such as storage (e.g., memory and/or other storage) and CPU (e.g., processing cycles) at the security platform. As such, the security platform typically is configured to start dropping packets when reaching certain limitations/bandwidth issues. As such, these limitations/bandwidth issues can prevent the effective and efficient detection and blocking of malware, such as when signatures are not available, and the inline machine learning anti-virus (MLAV) model cannot detect the malware. Moreover, when packets are dropped due to bandwidth limitations in the MICA solution, customers of the security solution may not fully experience the benefits of the MICA detection solution.

As a result, not all sessions can generally be forwarded using the MICA channel to the cloud security entity. As such, there is a need to effectively and efficiently prioritize session traffic that is selected for forwarding using the MICA channel to the cloud security entity.

Referring to FIG. 5, the MICA prefilter includes a rule-based component 505 and a prefilter model 510. These components of the MICA prefilter component are executed on the security platform for prioritizing traffic for selectively forwarding a subset of the monitored network traffic (e.g., a subset of files, such as a subset of Win PE files as further described below with respect to various embodiments) to the file manager (335) for further cloud security analysis (e.g., using WF static analysis 172, which can be implemented using a more heavyweight ML model that utilizes many more features, as such can be executed using server class hardware and is generally less resource (CPU/memory) constrained than the security platform) to enhance malware detection.

In this example implementation, the above-described signature check (134) and MLAV (135) components can be executed in parallel in a single pass and performed independently of the rule-based (505) and prefilter model (510) components for the MICA channel forwarding decision processing, which will now be further described below.

Specifically, as will be further described below, the MICA prefiltering can be based on applying certain criteria, such as whether the malicious session can be detected locally (e.g., based on signatures (e.g., using signature check 134) and/or based on use of local heuristic related techniques and/or machine learning (ML) techniques (MLT), such as the inline machine learning anti-virus (MLAV) model component (135) executed locally on the security platform as further described below). As such, by applying this criteria along with potentially other criteria as further described below, the disclosed techniques can facilitate that the most critical traffic is forwarded through the MICA channel for further cloud security analysis while less important traffic is dropped when a given bandwidth limit is reached.

In an example implementation, the MICA prefiltering supports Windows PE files (e.g., also referred to herein as PE files, and/or other file types can similarly be supported, such as Microsoft .net file types, Adobe PDF files, etc.). In this example implementation, before forwarding the samples using the MICA channel for further cloud security analysis, various rules can be applied as a subset of criteria that is used to determine whether to forward the PE file using the MICA channel for further cloud security analysis.

As an example, a content decoder component of the security platform (e.g., content decoder 244 as shown in FIG. 2B) can be used to automatically check if a PE file is signed or not by parsing the Certificate Table within the Option header of the PE file. A rule included in the rule-based component (505) can provide that unsigned PE files be analyzed using the MICA prefiltering model to determine whether such unsigned PE files should be forwarded using the MICA channel for further cloud security analysis. Another rule included in the rule-based component (505) can provide that PE files that are signed by a trusted entity (e.g., Microsoft and/or other entities can be configured in this rule as trusted entities) will not be forwarded using the MICA channel for further cloud security analysis (e.g., PE files that are signed by a trusted entity are not held to await a verdict by the cloud security entity, such as further described below with respect to FIG. 7).

Similarly, the content decoder component of the security platform can check if the file is a supported file type, such as a PE or .net file type before forwarding the file using the MICA channel for further cloud security analysis.

Other example rules that can be implemented in the rule-based component of the MICA prefiltering can include a digital signer check (e.g., do not forward if the file is signed by a trusted entity), a URL check (e.g., do not forward if the file is associated with a benign URL, or default forward if the file is associated with a malicious URL, etc.), if the file is malformed and cannot be opened, if the file contains dangerous attributes and should be analyzed, and/or various other rules and/or heuristics can similarly be implemented for PE and/or other file types.

In addition, the MICA prefiltering includes the prefilter model component. In this example implementation, the prefiltering model component is a ML model that is trained and generated to make MICA channel forwarding decisions for files (e.g., PE files in this example implementation) received at the security platform based on the first 1500 bytes of PE files. The content decoder of the security platform (e.g., content decoder 244 as shown in FIG. 2B) can be used to extract certain features that are used as input to the ML model. The security platform also checks the MICA prefilter model result to determine whether to forward the PE file using the MICA forwarding channel. If the verdict is positive (e.g., exceeds a predetermined threshold based on feature analysis using the prefilter model), then the PE file is automatically forwarded for further analysis. Otherwise (e.g., if there is no rule match and the prefilter model is negative), then the PE file is not forwarded to the MICA channel for further security analysis (e.g., and can be dropped if the security platform exceeds a bandwidth/other capacity limit/threshold as similarly described herein).

In this example implementation, the prefiltering model component is implemented using a lightweight ML model for performing the prefilter decision for PE files based on the first 1500 bytes. For PE files, based on our experiments, the malware to benign ratio for customer samples of PE files is approximately 0.6%. The output of the prefiltering model component is a Forward or Do Not Forward result. As will be further described below, the prefiltering model component is trained and generated to learn from historical data and improve its accuracy over time (e.g., based on periodic updated training with new samples). The prefiltering model component is generally optimized for low resource consumption and low latency to avoid affecting network performance on the security platform.

In this example implementation of the MICA prefilter model, the MICA prefilter model can be generated using a combination of feature extraction, relabeling, and machine learning techniques (MLT). Specifically, the MICA prefilter model can utilize n-gram features (e.g., greater than 900 ML n-gram features are used in this example implementation of the MICA prefilter model for PE files, which can be generated using an n-gram histogram that utilized a sliding window with a window size of 8-grams, i.e., 8-bytes, to generate an output of an n-gram pattern, total count in malware files, and total count in benign files to facilitate ML based on n-gram feature selection) as well as customized features (e.g., greater than 50 handcrafted PE header features by security analysis are used in this example implementation of the MICA prefilter model for PE files, which can include PE header features that can effectively and efficiently be processed by the content decoder of the security platform, which can include, for example, a number of sections in the PE file or certain types of sections being included in the PE file (e.g., forward if the PE file exceeds a threshold number of sections and/or a threshold number of certain types of sections, such as execute sections, hidden sections, write execute sections, etc.)). The MICA prefilter model is implemented as an XGBoost model to make these MICA channel forwarding decisions (e.g., based on a score that will determine whether to forward the PE file if a threshold score is exceeded, which can be formulated to minimize false positives (FPs) and to reduce the bandwidth/capacity issues as similarly described herein).

As will also be further described below, the MICA prefilter model can be trained with weighted samples to minimize false positives (FPs) and is optimized to meet the target byte forwarding rate. As an example, a PE file may be determined to be suspicious but does not generate a malicious verdict based on the inline analysis performed at the security platform (e.g., based on the analysis performed using the MLAV component (135), the PE file may not exceed a malicious verdict threshold score but may be near that threshold, such that it is likely suspicious), but not exceeding the threshold, this is the type of file that the MICA prefilter model may likely yield a score that exceeds the forward verdict threshold such that the PE file is then forwarded to the MICA channel for further cloud security analysis (e.g., given that MLAV has an approximate FP rate of 0.25% (e.g., on real traffic) versus an approximate target forwarding rate of 1% of PE files that are to be forwarded using the MICA channel, there is a gap of gray area/suspicious files that will generally be forwarded using the disclosed techniques using the MICA prefilter model).

These and various other techniques for machine learning for prioritizing traffic in multi-purpose inline cloud analysis (MICA) to enhance malware detection will now be further described below with respect to various process embodiments.

Figure 6:
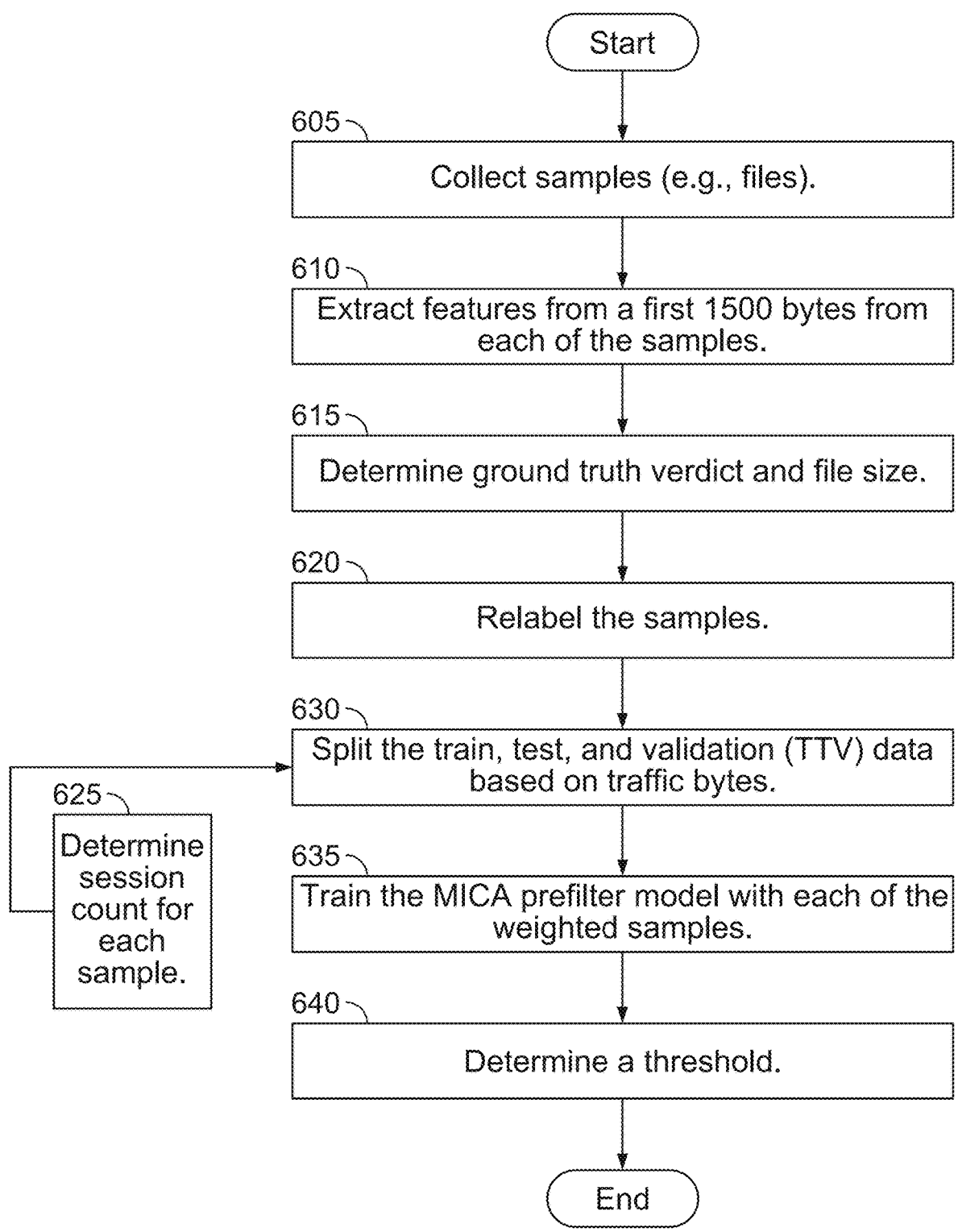
FIG. 6 is a flow diagram training the MICA prefilter model in accordance with some embodiments.

Example Process Embodiments for Machine Learning for Prioritizing Traffic in Multi-Purpose Inline Cloud Analysis (Mica) to Enhance Malware Detection Training the Mica Prefilter Model FIG. 6 is a flow diagram training the MICA prefilter model in accordance with some embodiments. In some embodiments, process 600 is implemented at least in part by security service 140 of FIG. 1. Process 600 may be implemented by the malicious sample detector (e.g., as shown at 172 of FIG. 1 or other enterprise server class hardware and/or cloud computing resources), such as in connection with generating and training an ML model that can be executed locally on a security platform (e.g., as shown at 102 of FIG. 1) for offloading processing data from the security platform to the security service (e.g., as shown at 140 of FIG. 1).

As similarly described above, in an example implementation, the MICA prefilter model can be trained and generated with a target of a 1% forwarding rate (e.g., as similarly described above and further discussed below, 1% is an example forwarding rate that is the target forwarding rate for PE file samples in view of the approximate low false positive (FP) rate of about 0.25% of the MLAV detector for PE file samples relative to the unique MICA detection rate of PE file samples using the MLAV detector of approximately 6.78% and an overall PE file samples malware rate of about 3.6% based on experiments). As such, different target forwarding rates can be used for different file types (e.g., which can have different local detection and FP rates on the security platform implemented detector(s)), based on bandwidth/capacity resources of the security platform, and/or based on other constraints, objectives, resource limitations, etc.

Referring to FIG. 6, at 605, collecting of samples is performed. In this example implementation, PE file samples are collected for training the MICA prefilter model. The PE file samples include both benign and malware samples of PE files.

At 610, extracting of features from a first 1500 bytes from each of the samples is performed. In this example implementation, n-gram (e.g., 8-gram) features and customized features are extracted at the end of a file or from the first 1500 bytes of each PE file sample. Specifically, all samples that are forwarded to the security service (e.g., WildFire (WF) or another cloud security engine can similarly be used) are processed and the first packet (e.g., first 1500 bytes) is stored. If there is no overlay in the first 1500 bytes of the PE file sample, then the n-gram (e.g., 8-gram) features and customized features are extracted at the end of the file or 1500 bytes. If there is an overlay in the first 1500 bytes of the PE file sample, then the n-gram (e.g., 8-gram) features and customized features are extracted at the start of the overlay. Features can also be scaled and then clipped to the range of 0~255 bytes.

At 615, a ground truth (GT) verdict and file size for each sample is determined. In this example implementation, the production MLAV models are run for each single day's sample data, and a file hash (e.g., an SHA256 hash of the file submitted to Wildfire from the security platform and/or another file hash can similarly be used) is checked against an allow list for known good PE files (e.g., the allow list can be generated and updated based on prior cloud security analysis results of PE file samples). Samples that the local security platform detector(s) (e.g., the MLAV detector such as shown at 135 in FIGS. 1 and 5) predicted as positive (e.g., true positives and false positives) and negative (e.g., true negatives and false negatives) are obtained. The samples are labeled with a ground truth (GT) verdict (e.g., using third-party sources such as another cloud security engine). In addition, file size information is retrieved for each sample from the WF database.

At 620, relabeling the samples is performed. In this example implementation, the sample labels and file size are obtained from the WF behavior monitor system ground truth verdict (e.g., and/or another cloud security engine can similarly be used) as similarly described above. Specifically, aiming at forwarding only false negative (FN) samples from the local security platform detector(s) (e.g., the MLAV detector such as shown at 135 in FIGS. 1 and 5), for each sample, the following relabeling techniques are performed.

If the sample ground truth (GT) verdict is positive and the MLAV prediction is negative (e.g., the MLAV result represents a FN), then it is labeled as positive. Otherwise, it is labeled as benign.

At 625, a session count for each sample is determined. In this example implementation, the session count is from a session data store (e.g., a WF session MySQL database from the WF behavior monitor system and/or another cloud security engine can similarly be used).

At 630, splitting the train, test, and validation (TTV) data is performed. In this example implementation, splitting the TTV data based on traffic bytes (e.g., instead of samples, which is how the MLAV model is trained based on just using samples) is performed. For example, the TTV data generation can include 14 days of data that is collected, and a random split with a ratio of 8:1:1 can then be used to generate the TTV data set.

At 635, training the MICA prefilter model with each of the weighted samples is performed. In this example implementation, the MICA prefilter model is trained on XGBoost (e.g., Random Forest, Support Vector Classifier, Catboost, LightGBM, and/or other MLTs can similarly be used) with each of the weighted samples (e.g., the weight for each of the samples can be calculated based on traffic bytes, such as based on session count and file size). As a specific example for weighting of the PE file samples, each sample can be assigned a smoothed weight based on the following equation: 1 plus the session count multiplied by the file size (in bytes)/1024. Another weighting is applied for the benign samples to reduce the false positive (FP) rate. Other weighting of the samples can similarly be applied based on the objectives for the MICA prefilter model and types of sample, such as based on the bandwidth/capacity resources of the security platform, and/or based on other constraints, objectives, resource limitations, etc.

At 640, a threshold is determined. In this example implementation, a threshold is calculated on a validation data set that is similarly weighted using the session count and file size as described above at stage 635. Specifically, in order to limit the traffic that is forwarded to the MICA channel, a threshold for the MICA prefilter model is to be determined. As such, predictions are determined in the validation data set, and each prediction is weighted based on the session count multiplied by the file size (in kilobytes). More specifically, in this example implementation, each prediction is weighted based on an equation session count multiplied by the file size (in bytes)/1024. Noting that the equation is not 1+session count*file size/1024 (e.g., as 1+session count*file size/1024 was used in the training weight to smooth the weight; however, smoothing of the weight in evaluation is not required). The prediction score is sorted along with the true labels. The FP rate, the true positive rate, and the byte forwarding rate are calculated as the prediction scores are scanned through. When the byte forwarding rate is greater than the target byte forwarding rate, then the prediction score is used as the threshold value for the MICA prefilter model. As such, when the MICA prefilter model is deployed to execute locally on a security platform for performing inline forwarding decisions for PE files to the MICA channel, the threshold can be used to determine whether or not a given PE file sample is to be forwarded based on whether or not its score exceeds that threshold value.

Applying the Mica Prefilter Model at an Inline Security Entity

Figure 7:
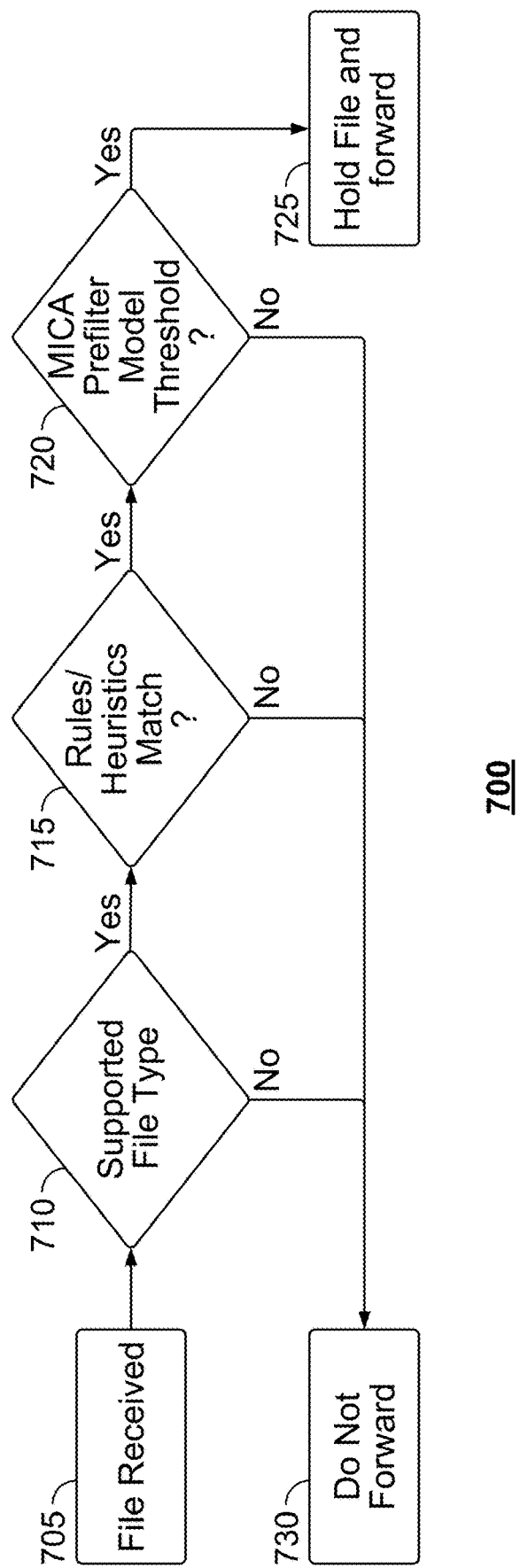
FIG. 7 is a flow diagram of applying the MICA prefilter model for forwarding decisions executed locally on a security platform in accordance with some embodiments.

FIG. 7 is a flow diagram of applying the MICA prefilter model for forwarding decisions executed locally on a security platform in accordance with some embodiments. In some embodiments, process 700 is implemented at least in part by system 100 of FIG. 1 and/or data appliance 102 of FIGS. 2A and 2B. Process 700 may be implemented by an inline security entity, such as in connection with offloading processing data to a cloud security entity (e.g., as shown at 140 of FIG. 1).

As similarly described above with respect to FIG. 5, the disclosed MICA prefiltering forwarding model executes locally on the security platform and can be executed in parallel with (e.g., adjacent to) other inline detection mechanisms (e.g., signature check 134 such as for antivirus signatures, MLAV 135, and/or other inline detection components executed locally on the security platform). Specifically, the MICA prefiltering model is used to determine whether or not a file received at the security platform should be forwarded to a cloud security entity (e.g., cloud service 140 of FIG. 1) (e.g., and held/stored until further analysis is completed with a verdict as benign or malicious at the cloud security entity).

Referring to FIG. 7, at 705, a file is received at a security platform. For example, the security platform can monitor network traffic as an inline security entity (e.g., on an enterprise network or other network environment).

At 710, the security platform determines whether the file is a supported file type. In this example implementation, supported file types include PE files as discussed above with respect to FIGS. 5 and 6. If the file is not a supported file type, then processing proceeds to stage 730, and the security platform is configured to not forward unsupported file types to the cloud security entity. Otherwise, processing proceeds to stage 715.

At 715, rules and/or heuristics are applied to the supported file type. Specifically, before the MICA prefilter model is invoked (e.g., applied to the supported file), additional filters are used to efficiently drop certain files that, for example, cannot be analyzed at the cloud security entity within predetermined latency targets (e.g., certain complex files, files associated with benign URLs, etc.). In this example implementation, the rules and/or heuristics can be implemented using the above described rule-based component (e.g., as shown at 505 of FIG. 5), which can include various rules/heuristics. As an example, a rule included in the rule-based component (505) can provide that PE files that are signed by a trusted entity (e.g., Microsoft and/or other entities can be configured in this rule as trusted entities) will not be forwarded using the MICA channel for further cloud security analysis. If the file matches one or more of the rules and/or heuristics, then processing proceeds to stage 720, and the security platform is configured to not forward the file to the cloud security entity, such as similarly described above with respect to FIG. 5. Otherwise, processing proceeds to stage 730.

As similarly discussed above with respect to FIGS. 5 and 6, the MLAV model and MICA prefiltering models can be executed in parallel on the security platform as they can be executed independently. If either determines to block the file, then the security platform can be configured to automatically block the file (e.g., based on a security/firewall policy associated with the security platform). As such, the MICA prefiltering model is not determining whether a sample (e.g., PE file) based on 1500 bytes of the file is malicious or not based on an FP rater. Rather, the MICA prefiltering model is trained and generated to be based on a metric that is to forward a target percentage of the traffic/subset of the files associated with the traffic (e.g., as the MICA prefiltering model and disclosed techniques are targeted to reduce the impact on bandwidth/computing resources by forwarding all/too much traffic).

At 720, the MICA prefiltering model is applied to the file to determine whether a score resulting from applying the model to the file exceeds a predetermined threshold (e.g., the threshold value for the MICA prefiltering model as similarly described above with respect to FIG. 6). If a result of applying the MICA forwarding model for the file does not exceed the threshold score, then processing proceeds to stage 730, and the security platform is configured to not forward the file to the cloud security entity, such as similarly described above with respect to FIG. 6. Otherwise, the score for the file exceeds the predetermined threshold and processing proceeds to stage 725 at which the security platform is configured to hold/store the file (e.g., the file can be stored locally on the security platform in a cache/memory) and forward the file using the MICA channel to the cloud security entity, such as similarly discussed above with respect to FIGS. 1, 4, and 5.

FIGS. 8A-8B are tables of evaluation metrics of experiment results. Referring to FIGS. 8A-8B, experiment results show that the disclosed techniques for machine learning for prioritizing traffic in multi-purpose inline cloud analysis (MICA) to enhance malware detection can significantly reduce noise by not forwarding content (e.g., certain Win PE files that do not satisfy certain rules/heuristics and the threshold score of the MICA prefiltering model) and that such do not need to be forwarded to the cloud security entity as such are not malicious (e.g., as similarly discussed above, empirical results have indicated a malware rate of PE files at about 0.6% (malware to benign ratio)).

Specifically, referring to FIG. 8B, benign versus malware means that in the training data set, the ground truth label of benign and malware samples was used. Benign versus malware not detected by MLAV (after relabeling) means the following process of relabeling. We first calculate the MLAV prediction verdict on each sample. We then relabel the malware samples as benign if the MLAV prediction verdict is malicious. We then relabel the rest of samples as benign. As such, in both row two and row three, the verdicts in evaluation and test set are the same. Row two has better efficacy than row three, but they are both much better than row one (no MICA prefiltering).

As such, the disclosed techniques for machine learning for prioritizing traffic in multi-purpose inline cloud analysis (MICA) to enhance malware detection provide a solution to a significant challenge for current security technology solutions, as managing bandwidth limitations and efficiently prioritizing traffic is a common challenge for existing network security solutions. Also, identifying an inline machine learning (ML) model's false negatives (FNs) provides a valuable input for the above-described MICA channel solution for offloading certain security analysis from an inline security entity (e.g., security platform) to a cloud security entity (e.g., cloud security service).

Moreover, by implementing the MICA prefilter model, the disclosed techniques for machine learning for prioritizing traffic in multi-purpose inline cloud analysis (MICA) to enhance malware detection can improve an overall malware detection rate as similarly discussed above.

Figure 9:
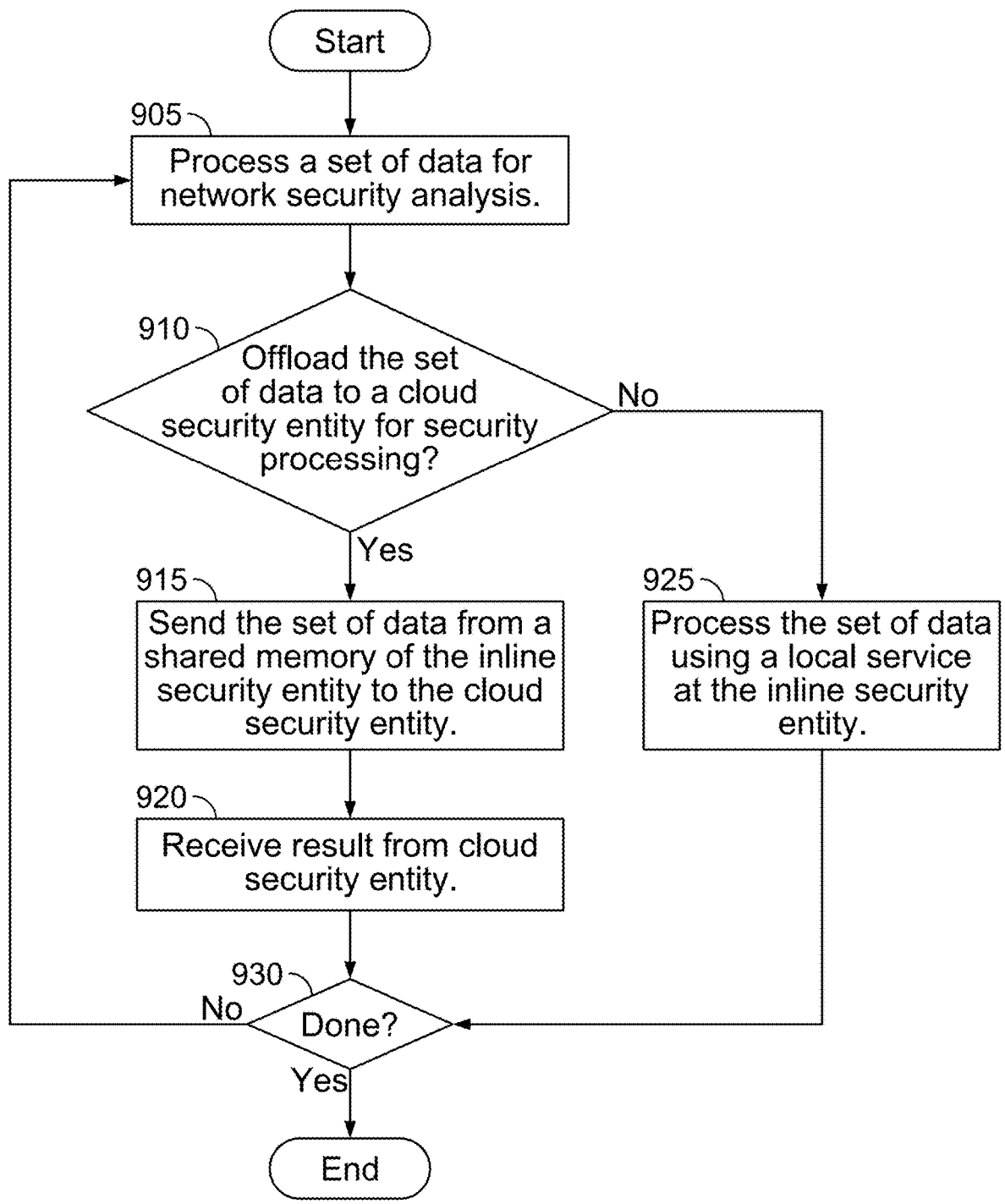
FIG. 9 is a flow diagram of a process for applying the MICA channel for offloading from an inline security entity to a cloud security entity in accordance with some embodiments.

Applying the Mica Channel for Offloading from an Inline Security Entity to a Cloud Security Entity FIG. 9 is a flow diagram of a process for applying the multi-purpose inline cloud analysis (MICA) channel for offloading from an inline security entity to a cloud security entity in accordance with some embodiments. In some embodiments, process 900 is implemented at least in part by system 100 of FIG. 1 and/or data appliance 102 of FIGS. 2A and 2B. Process 900 may be implemented by an inline security entity, such as in connection with offloading processing data to a cloud security entity (e.g., as shown at 140 of FIG. 1).

At 905, a set of data is processed for security analysis. The system (e.g., an inline security entity) obtains data that is to be processed. The set of data may correspond to traffic data (e.g., traffic across a network), application data (e.g., information processed or generated by an application), input strings, files, etc.

At 910, the system determines whether to offload the set of data to a cloud security entity for security processing. In some embodiments, the inline security entity is configured to perform low-latency processing locally and to offload heavy compute processing to the cloud security entity. In response to receiving data, the inline security analysis determines whether to process the set of data locally, such as by using information stored in a cache of the inline security entity. As an example, the system determines whether to locally process the set of data using a local classifier, a policy, a mapping (e.g., a mapping of signatures to indications of whether the data is malicious), etc. As another example, in response to determining that a mapping of signatures to indications of whether data is malicious does not include a signature matching the set of data, the inline security entity determines to offload the security processing (e.g., analysis of whether the data is malicious, etc.) to the cloud security entity.

In response to determining to offload the set of data to the cloud security entity at 910, process 900 proceeds to 915 at which the set of data is sent from a shared memory of the inline security entity to the cloud security entity. In response to determining to offload the set of data to the cloud security entity, the set of data is stored in a shared memory and the set of data is obtained from the shared memory and communicated to the cloud security entity. In some embodiments, processes running on a data plane of the inline security entity store the set of data (e.g., messages for the set of data) to a shared memory in connection with providing the set of data, or a request for the cloud security entity to process the set of data, to another process (e.g., the WIFClient) running on the data plane of the inline security entity. The shared memory may be used as a mechanism of inter-process communication between (i) processes (e.g., tasks, services, etc.) running on the data plane (e.g., running on the writer-side of the shared memory) and (ii) another process (e.g., a daemon, such as the WIFClient) that connects to the cloud service to send request messages or receive verdicts (e.g., result messages). In some embodiments, the other process (e.g., the WIFClient) retrieves the set of data from the shared memory, connects to the cloud security entity, and sends the set of data, or corresponding request message, to the cloud security entity (e.g., a file manager service running on the cloud security entity, which is configured to route the request messages to the corresponding cloud service).

In some embodiments, the storing the set of data to the shared memory is performed in a separate step from the sending the set of data from the shared memory to the cloud entity, or the sending the set of data may comprise the step of storing the set of data.

At 920, a result is received from the cloud security entity. In response to determining a result corresponding to the processing of the set of data (e.g., a result message), the cloud security entity sends the result to the inline security entity. In some embodiments, the cloud security entity provides the result to the process running on the reader-side of the shared memory (e.g., the WIFClient). In response to obtaining the result from the cloud security entity, the process running on the reader-side of the shared memory (e.g., the forward direction shared memory) writes the result to the shared memory system (e.g., the WIFClient writes the result message to the reverse direction shared memory).

In response to determining that the set of data is not to be offloaded to the cloud security entity at 910, process 900 proceeds to 925 at which the set of data is processed using local service at the inline security entity. In some embodiments, the inline security entity processes the set of data if the inline processing is not computationally intensive (e.g., the computation required is less than a computation threshold) or if the inline security entity stores information in a local cache that can be used to process the set of data (e.g., to determine whether the set of data is malicious, such as based on a previously analyzed sample).

At 930, a determination is made as to whether process 900 is complete. In some embodiments, process 900 is determined to be complete in response to a determination that no further data is to be processed (e.g., no traffic data is to be assessed with respect to a security analysis), an administrator indicates that process 900 is to be paused or stopped, etc. In response to a determination that process 900 is complete, process 900 ends. In response to a determination that process 900 is not complete, process 900 returns to 905.

Figure 10:
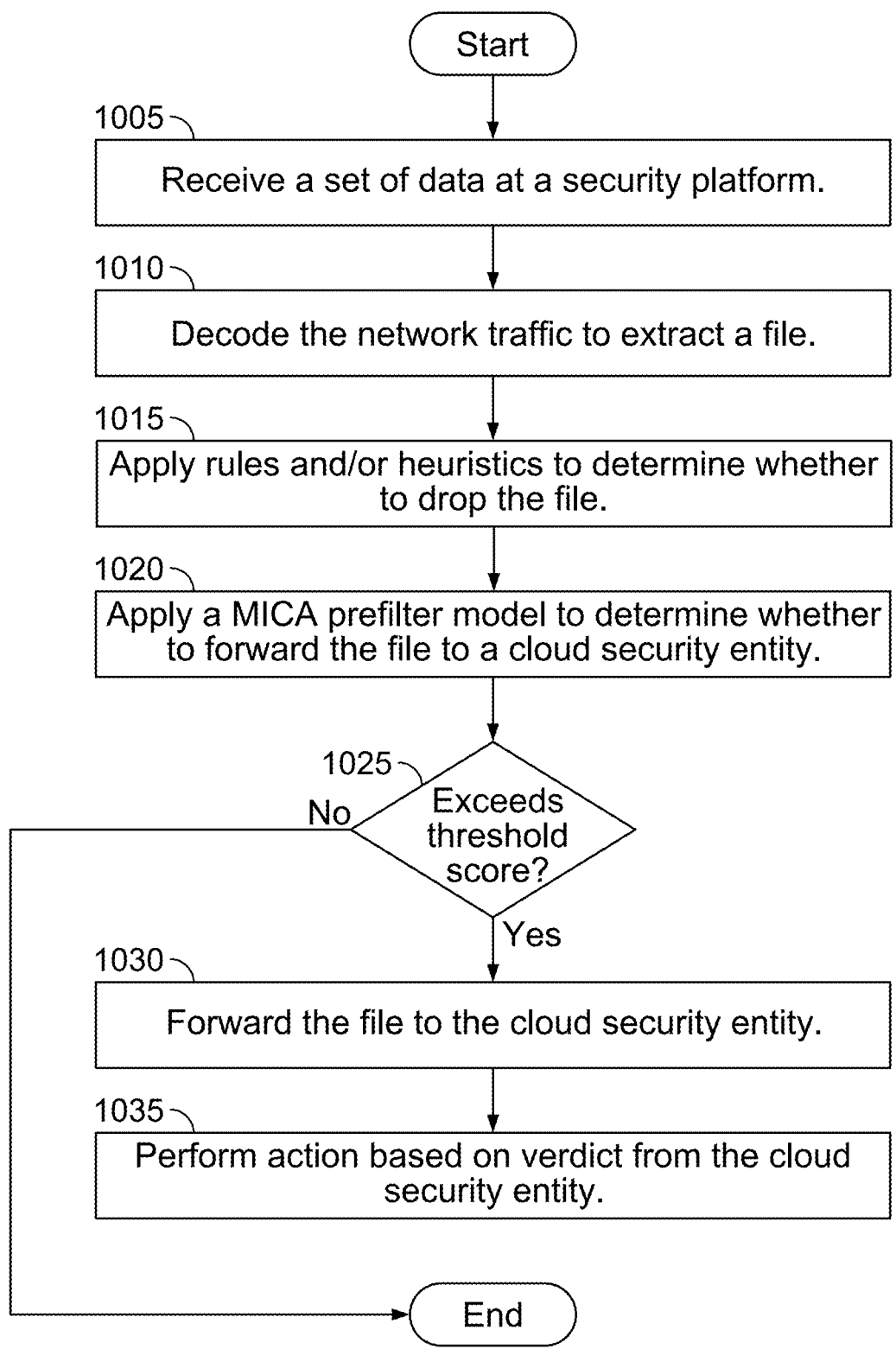
FIG. 10 is a flow diagram of a process for machine learning for prioritizing traffic in multi-purpose inline cloud analysis (MICA) to enhance malware detection in accordance with some embodiments.

Applying Machine Learning for Prioritizing Traffic in Multi-Purpose Inline Cloud Analysis (Mica) to Enhance Malware Detection FIG. 10 is a flow diagram of a process for machine learning for prioritizing traffic in multi-purpose inline cloud analysis (MICA) to enhance malware detection in accordance with some embodiments. In some embodiments, process 1000 is implemented at least in part by system 100 of FIG. 1 and/or data appliance 102 of FIGS. 2A and 2B. Process 1000 may be implemented by an inline security entity, such as in connection with offloading processing data to a cloud security entity (e.g., as shown at 140 of FIG. 1).

At 1005, a set of data is received at a security platform for security analysis. The security platform (e.g., an inline security entity) obtains data that is to be processed. The set of data may correspond to traffic data (e.g., traffic across a network), application data (e.g., information processed or generated by an application), input strings, files, etc.

At 1010, decoding the network traffic is performed at the security platform to extract a file. The security platform can include a decoder to decode various content as described above with respect to FIG. 2B.

At 1015, applying rules and/or heuristics is performed at the security platform to determine whether to drop the file. The security platform can apply various rules and/or heuristics as described above with respect to FIG. 5. For example, whether the file is a supported file type, a trusted source associated with the file, and/or other rules and/or heuristics can be performed as similarly described above.

At 1020, applying a MICA prefilter model to the file is performed at the security platform to determine whether to forward the file to a cloud security entity. The MICA prefilter model can be generated and trained (e.g., and periodic updated training based on new training data and/or constraints, file types, etc.) as described above with respect to FIG. 6.

At 1025, whether the result of applying the MICA prefilter model to the file exceeds a predetermined threshold score is determined. If the score is below the predetermined threshold score, then processing is completed. Otherwise, the score exceeds (e.g., equals or exceeds) the predetermined threshold score, and processing proceeds to stage 1030.

At 1030, forwarding the file from the security platform to the cloud security entity is performed. The security platform can forward the file to the cloud security entity as described above with respect to FIGS. 1 and 3-5.

At 1035, an action is performed based on a verdict received from the cloud security entity. For example, if the verdict is that the file is malicious (e.g., associated with malware or other undesired or nefarious or malicious activity or attributes), then the security platform can be configured to perform an action based on a security policy (e.g., block, drop, log, alert, and/or another action or combination of actions can be performed) as described above with respect to FIGS. 1 and 3-5.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for performing security processing at an inline security entity, comprising:
   one or more processors configured to:
      process a set of data for network security analysis to extract a file;
      determine that the file is to be offloaded to a cloud security entity for security processing based at least in part on a prefilter model that is implemented as a machine learning model;
      forward the file to the cloud security entity using a multi-purpose inline cloud analysis (MICA) channel; and
      perform an action in response to receiving a verdict from the cloud security entity; and
   a memory coupled to the one or more processors and configured to provide the one or more processors with instructions.

2. The system of claim 1, wherein the inline security entity executes the prefilter model to prioritize a subset of a plurality of files to forward to the cloud security entity based on one or more constraints, wherein the one or more constraints include a bandwidth related constraint.

3. The system of claim 1, wherein the inline security entity executes the prefilter model in parallel with a malware detector executed locally on the inline security entity.

4. The system of claim 1, wherein the inline security entity executes the prefilter model in parallel with a malware detector executed locally on the inline security entity, and wherein the prefilter model is applied to automatically determine whether the file is to be forwarded to the cloud security entity.

5. The system of claim 1, wherein the file is forwarded to a cloud instance of a file manager, and the file manager forwards the file to the cloud security entity.

6. The system of claim 1, wherein the set of data is sent from a shared memory of the inline security entity to a file manager by a data plane of the inline security entity.

7. The system of claim 1, wherein the inline security entity applies one or more rules and/or heuristics to the file prior to applying the prefilter model to the file.

8. The system of claim 1, wherein the inline security entity applies one or more rules and/or heuristics to the file prior to applying the prefilter model to the file, and wherein the inline security entity determines to not forward the file based on a match with one or more of the rules and/or the heuristics.

9. The system of claim 1, wherein the inline security entity applies one or more rules and/or heuristics to the file prior to applying the prefilter model to the file, wherein the inline security entity determines to not forward the file based on a match with one or more of the rules and/or the heuristics, and the prefilter model is not applied to the file.

10. A method for performing security processing at an inline security entity, comprising:
    processing a set of data for network security analysis to extract a file;
    determining that the file is to be offloaded to a cloud security entity for security processing based at least in part on a prefilter model that is implemented as a machine learning model;
    forwarding the file to the cloud security entity using a multi-purpose inline cloud analysis (MICA) channel; and
    performing an action in response to receiving a verdict from the cloud security entity.

11. The method of claim 10, wherein the inline security entity executes the prefilter model to prioritize a subset of a plurality of files to forward to the cloud security entity based on one or more constraints, wherein the one or more constraints include a bandwidth related constraint.

12. The method of claim 10, wherein the inline security entity executes the prefilter model in parallel with a malware detector executed locally on the inline security entity.

13. The method of claim 10, wherein the inline security entity executes the prefilter model in parallel with a malware detector executed locally on the inline security entity, and wherein the prefilter model is applied to automatically determine whether the file is to be forwarded to the cloud security entity.

14. The method of claim 10, wherein the inline security entity applies one or more rules and/or heuristics to the file prior to applying the prefilter model to the file.

15. A computer program product for performing security processing at an inline security entity embodied in a non-transitory computer readable medium, and the computer program product comprising computer instructions for:
    processing a set of data for network security analysis to extract a file;
    determining that the file is to be offloaded to a cloud security entity for security processing based at least in part on a prefilter model that is implemented as a machine learning model;
    forwarding the file to the cloud security entity using a multi-purpose inline cloud analysis (MICA) channel; and
    performing an action in response to receiving a verdict from the cloud security entity.

16. The computer program product recited in claim 15, wherein the inline security entity executes the prefilter model to prioritize a subset of a plurality of files to forward to the cloud security entity based on one or more constraints, wherein the one or more constraints include a bandwidth related constraint.

17. The computer program product recited in claim 15, wherein the inline security entity executes the prefilter model in parallel with a malware detector executed locally on the inline security entity.

18. The computer program product recited in claim 15, wherein the inline security entity executes the prefilter model in parallel with a malware detector executed locally on the inline security entity, and wherein the prefilter model is applied to automatically determine whether the file is to be forwarded to the cloud security entity.

19. The computer program product recited in claim 15, wherein the inline security entity applies one or more rules and/or heuristics to the file prior to applying the prefilter model to the file.

* * * * *